United States Patent [19]

Cross et al.

[11] 4,253,560
[45] Mar. 3, 1981

[54] TRANSFER CONVEYOR FOR FROZEN CONFECTIONS

[75] Inventors: Stephen D. Cross, Fremont, Calif.; Wilber C. Belk, Lakeland, Fla.; Elmer F. Frost, Jr., Lakeland, Fla.; William M. Easter, Lakeland, Fla.

[73] Assignee: FMC Corporation, San Jose, Calif.

[21] Appl. No.: 45,040

[22] Filed: Jun. 4, 1979

[51] Int. Cl.³ .............................................. B65G 29/00
[52] U.S. Cl. ................................. 198/479; 198/653; 198/696; 294/116
[58] Field of Search ............... 198/479, 486, 653, 694, 198/695, 696; 226/173; 294/116; 414/739

[56] References Cited

U.S. PATENT DOCUMENTS

| 928,172 | 7/1909 | Bernardin | 198/479 X |
| 2,332,058 | 10/1943 | Cattonar et al. | 294/116 X |
| 3,232,451 | 2/1966 | Andren | 198/486 X |

Primary Examiner—Robert B. Reeves
Assistant Examiner—Douglas D. Watts
Attorney, Agent, or Firm—R. S. Kelly; T. J. McNaughton

[57] ABSTRACT

In a system for producing frozen confections without molds, a transfer conveyor is provided for picking up the confections from a freezer conveyor and dropping them on a wrapper conveyor which transfer conveyor includes a large number of carriages pivotally mounted in series to an endless chain. Each carriage has a pair of scissorable arms and tongs detachably mounted to the arms for engaging a confection. The arms are opened by a wedge mounted on a push rod, and a pneumatic cylinder is used at the drop zone to rapidly extend the push rod and thereby quickly open the tongs so that the confection will fall through a predetermined trajectory. The retracted position of the wedge and rod, and thus the closed position of the tongs, is controlled by a stop assembly that is slidably mounted on the carriage. The positions of the stop assemblies of the carriages can be sequentially reset as they engage an adjustable deflector mounted to the main frame, thus vastly reducing the switchover time to a new type of confection. A track arrangement is provided for supporting the free ends of the carriages and includes a rod at the pickup point that is vertically adjustable to select the height at which a confection is grasped. A mechanism is also provided for sensing when a confection is stuck to the freezer conveyor which operates to disengage the tongs from the stuck confection at the pickup point.

18 Claims, 25 Drawing Figures

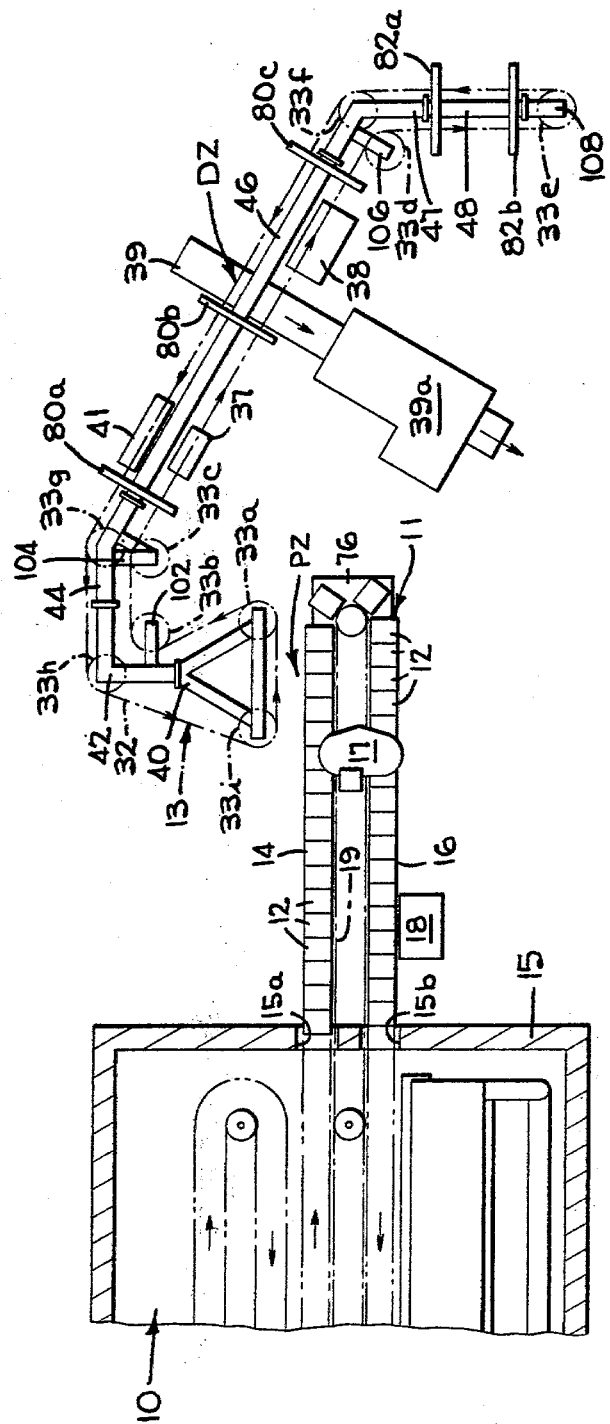

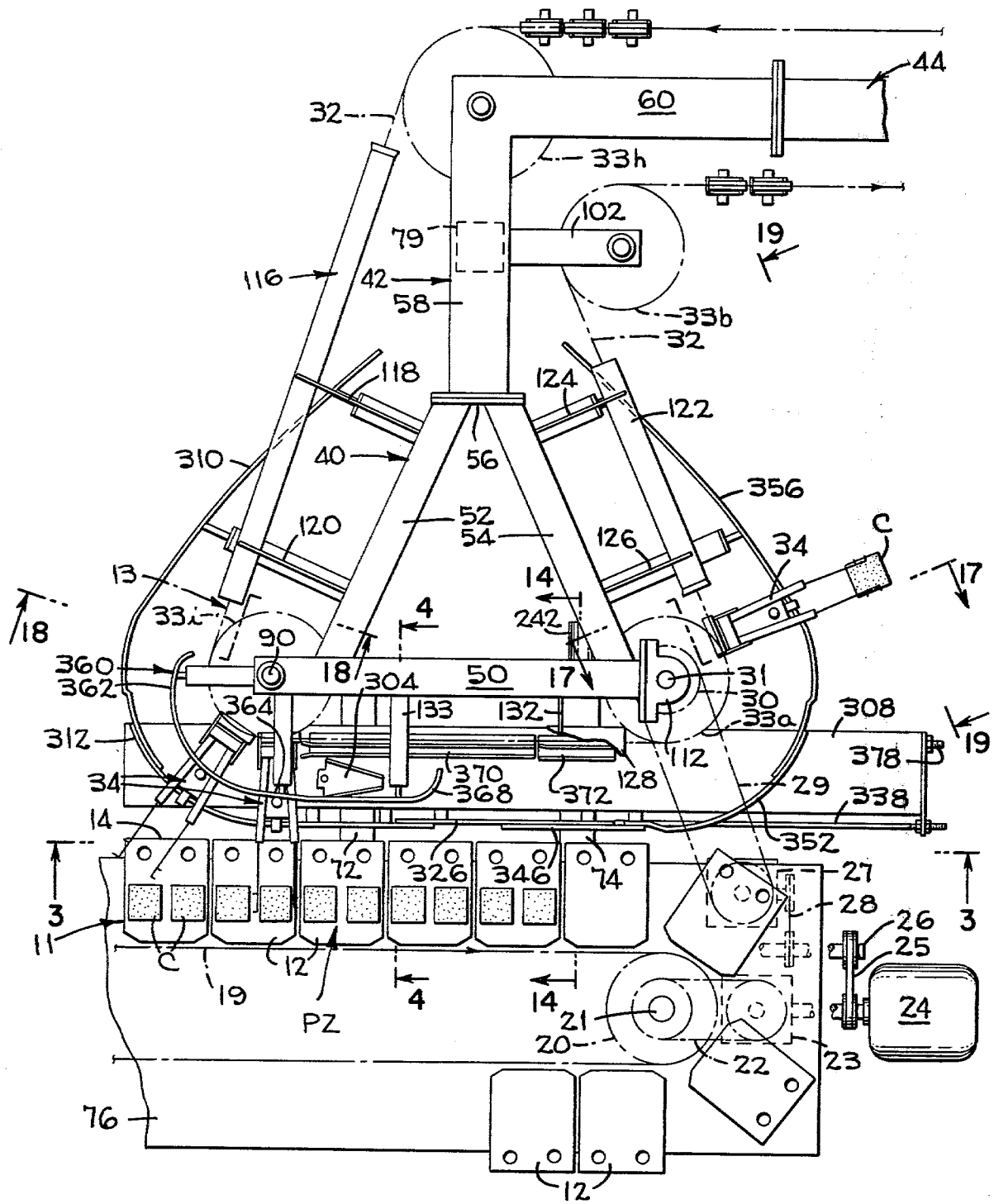

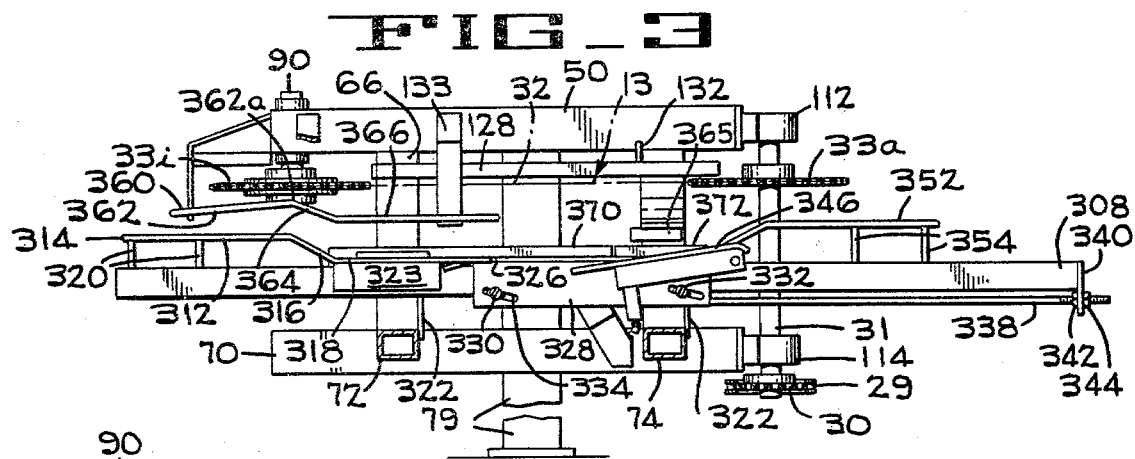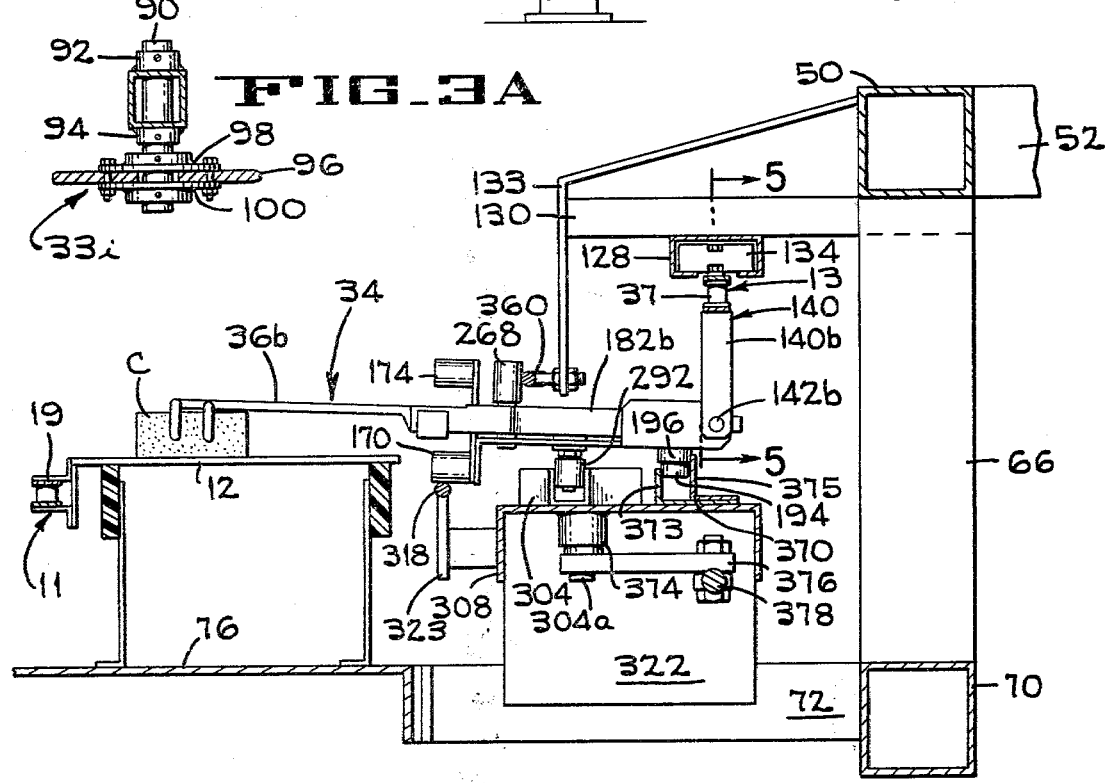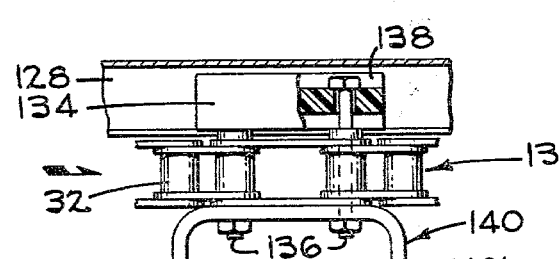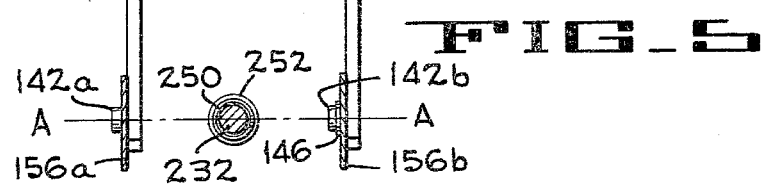

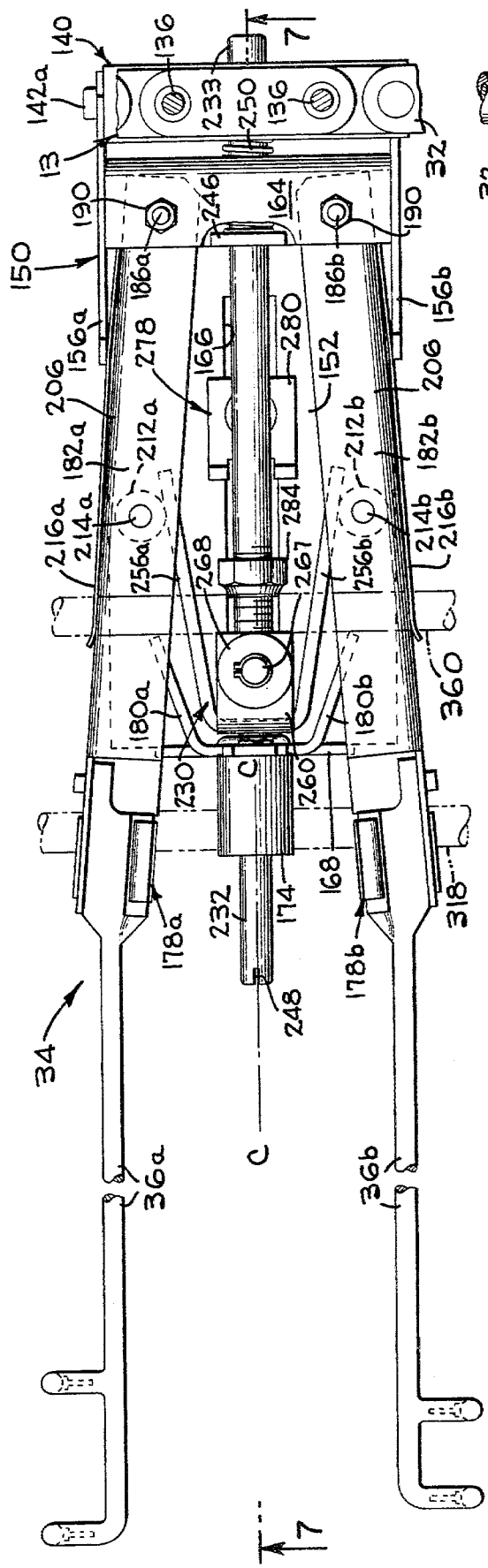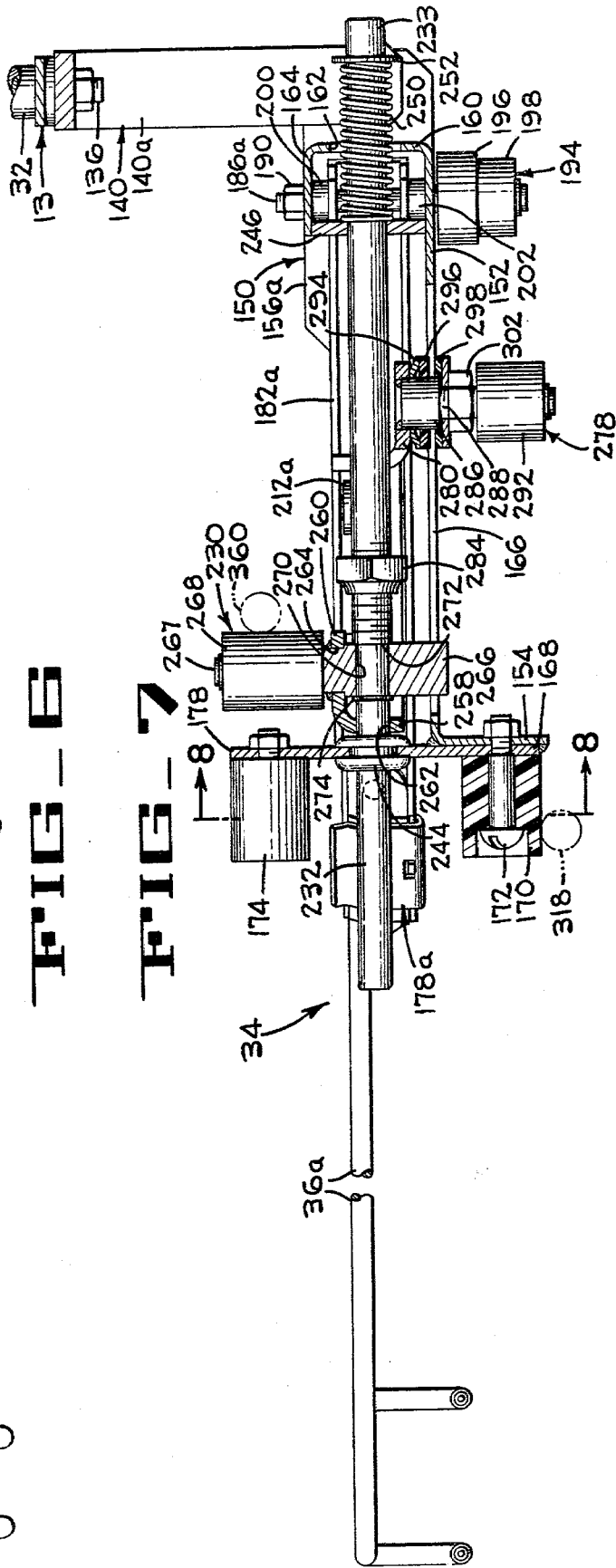

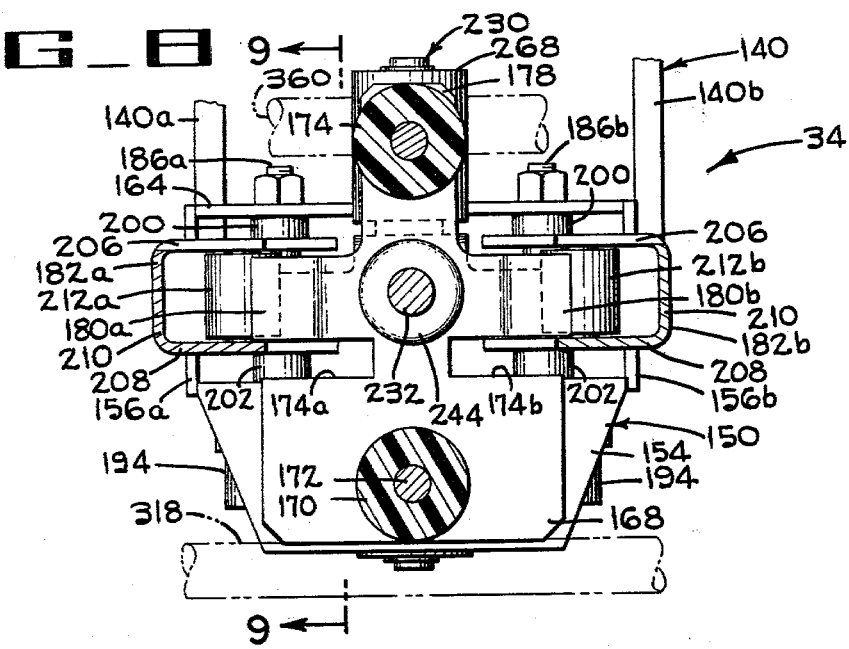
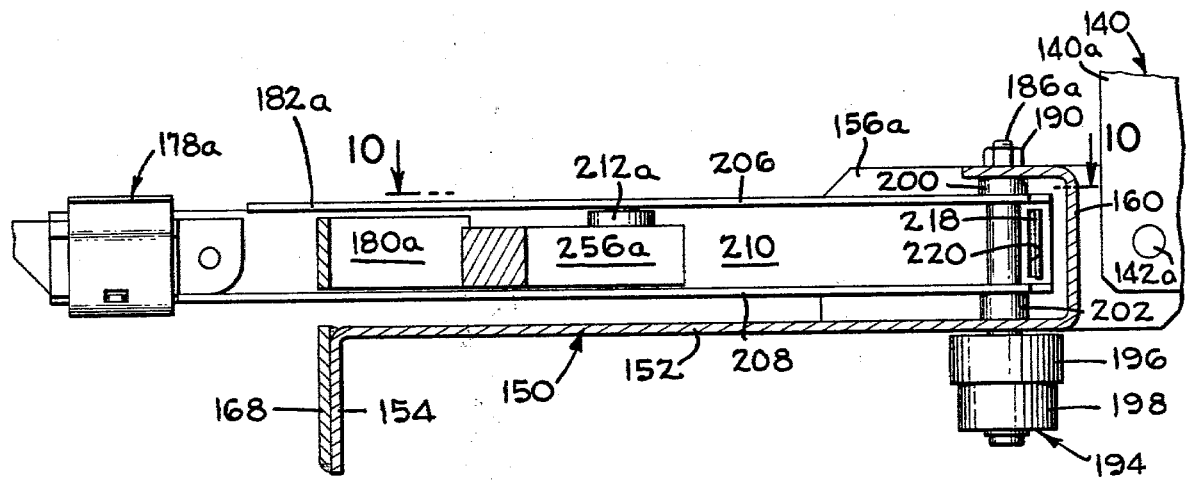
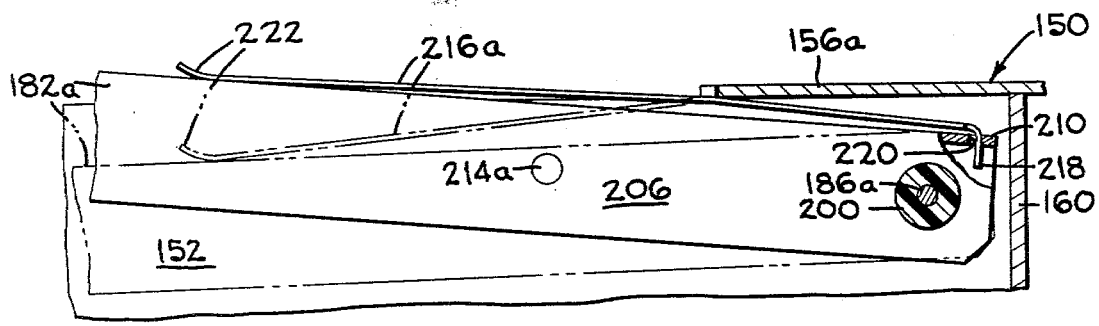

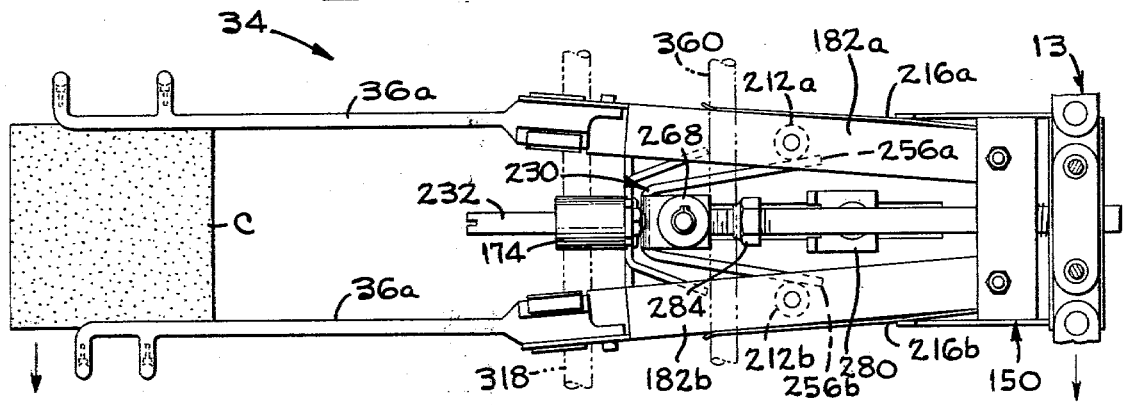
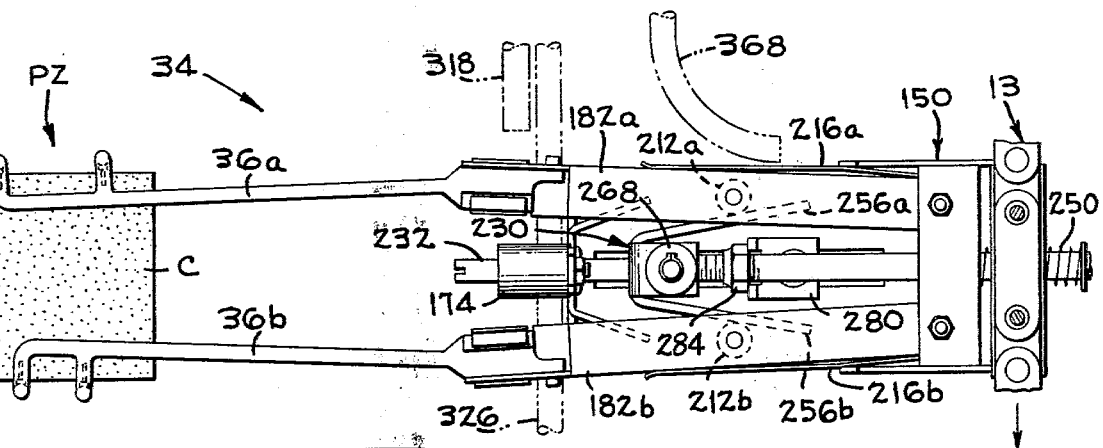
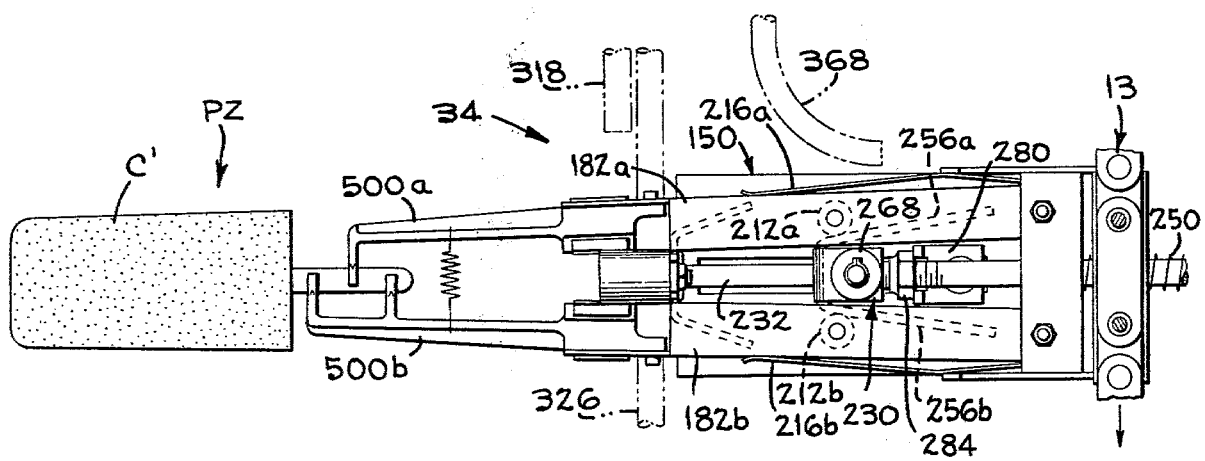

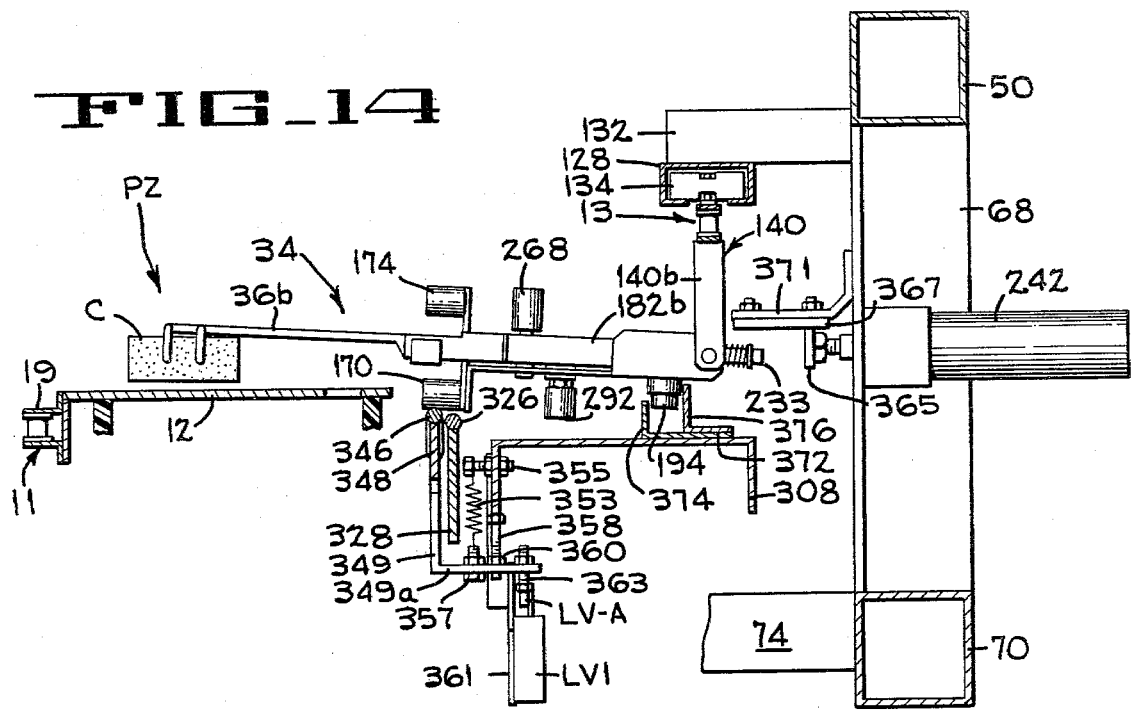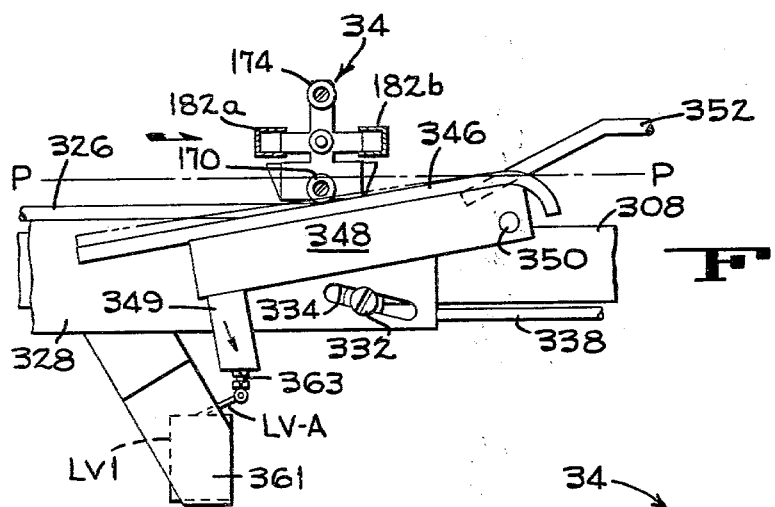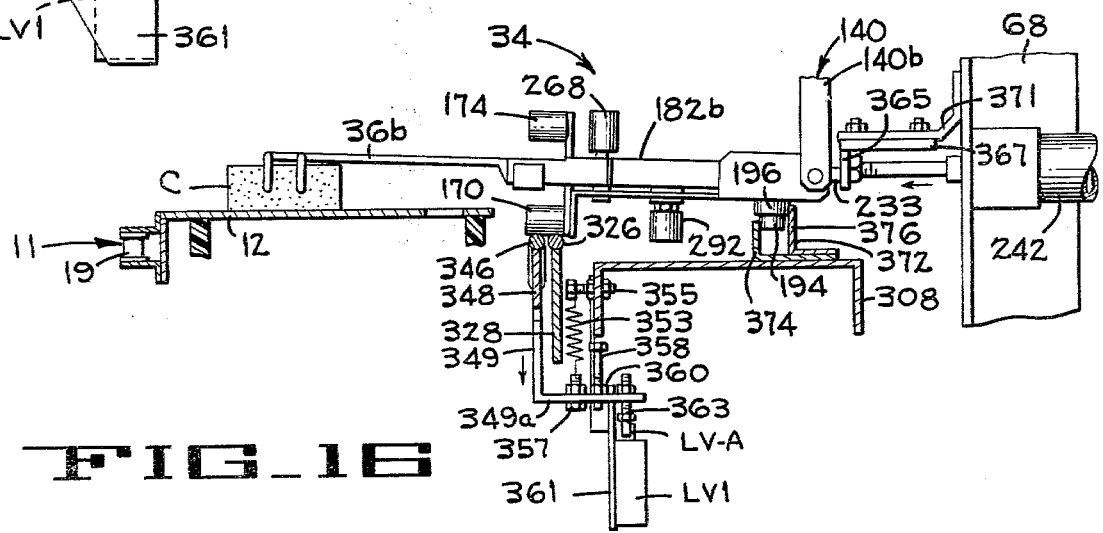

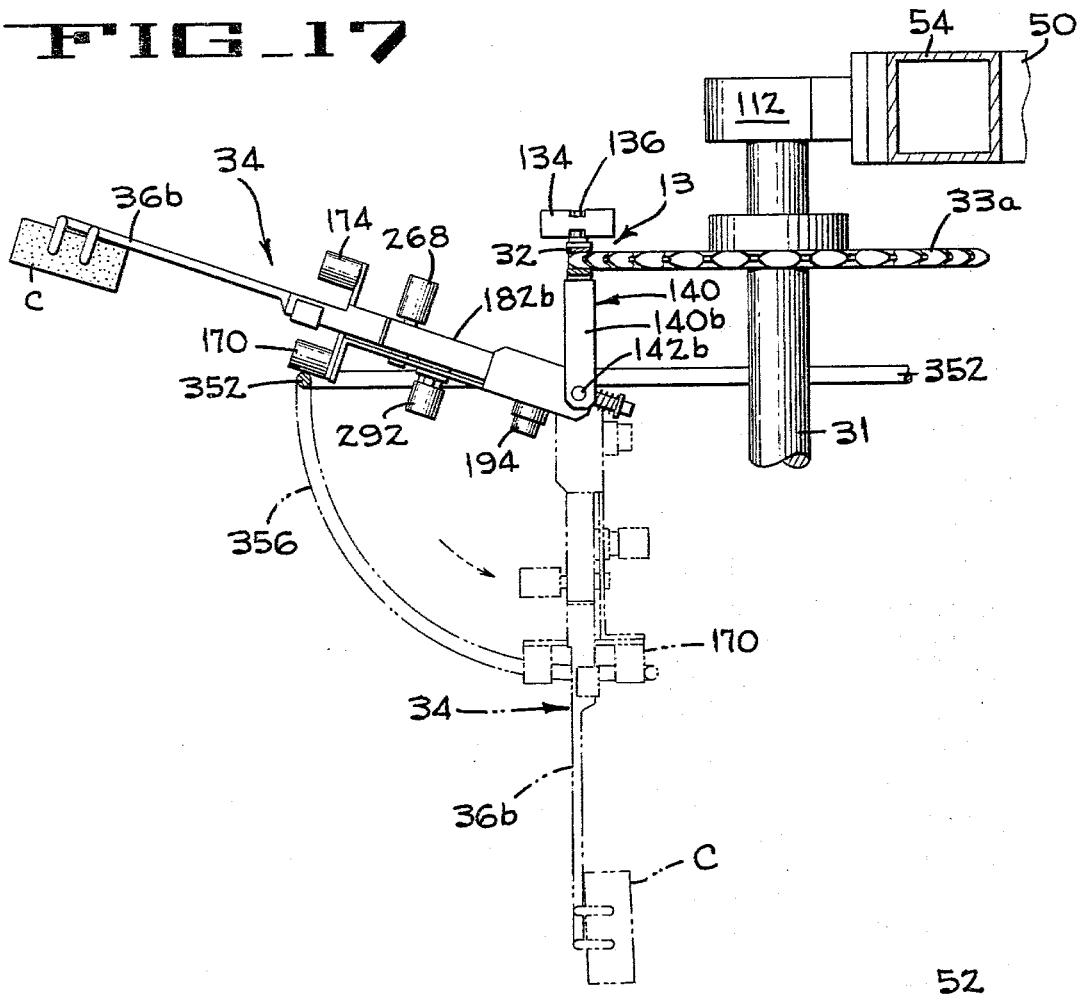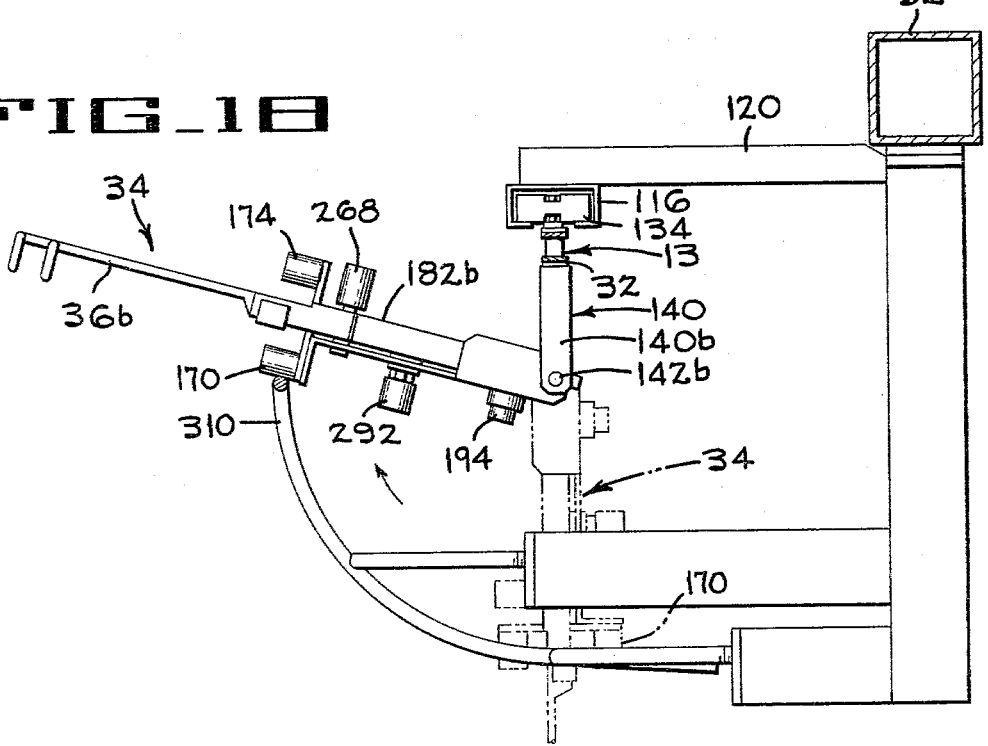

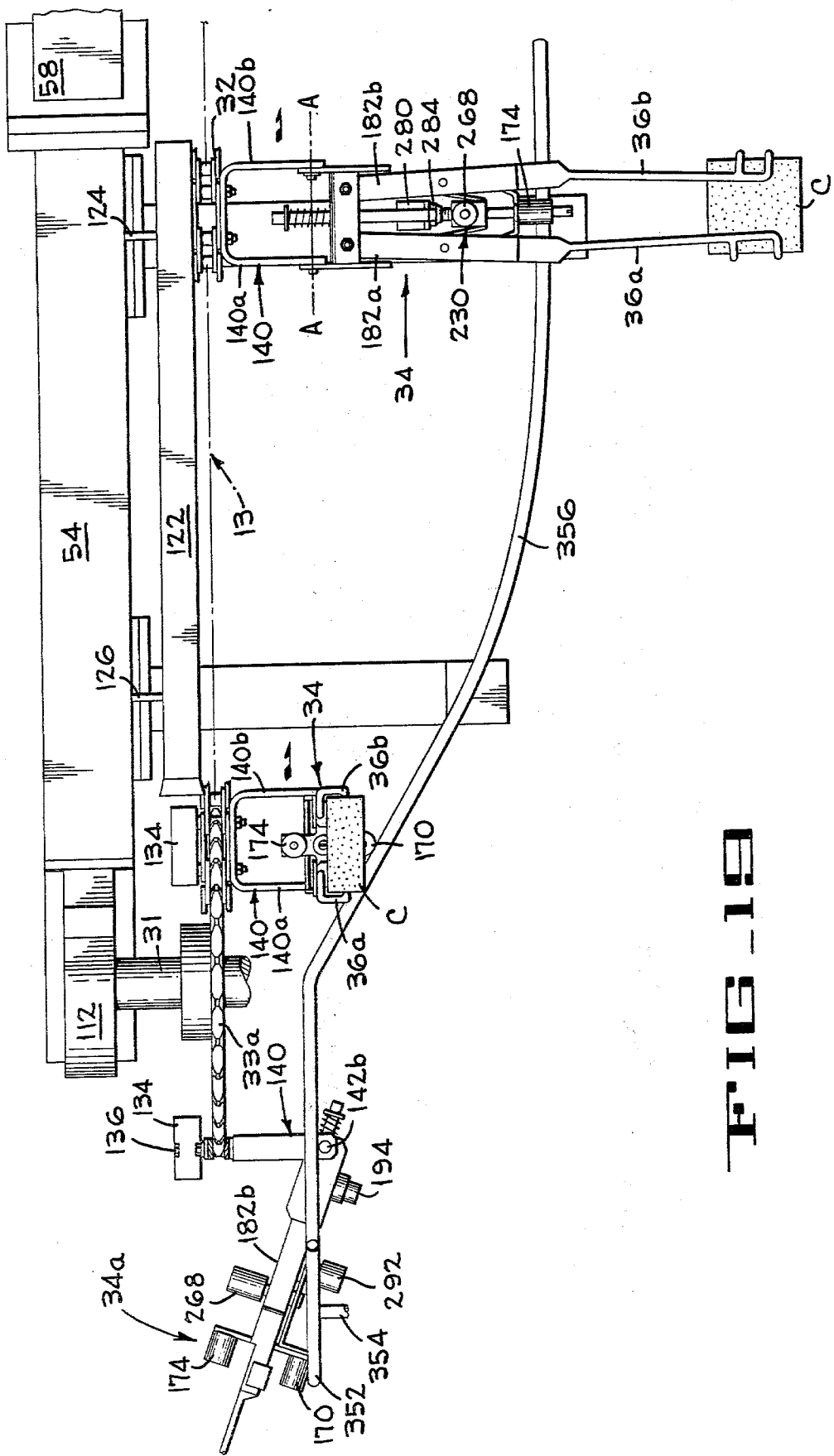

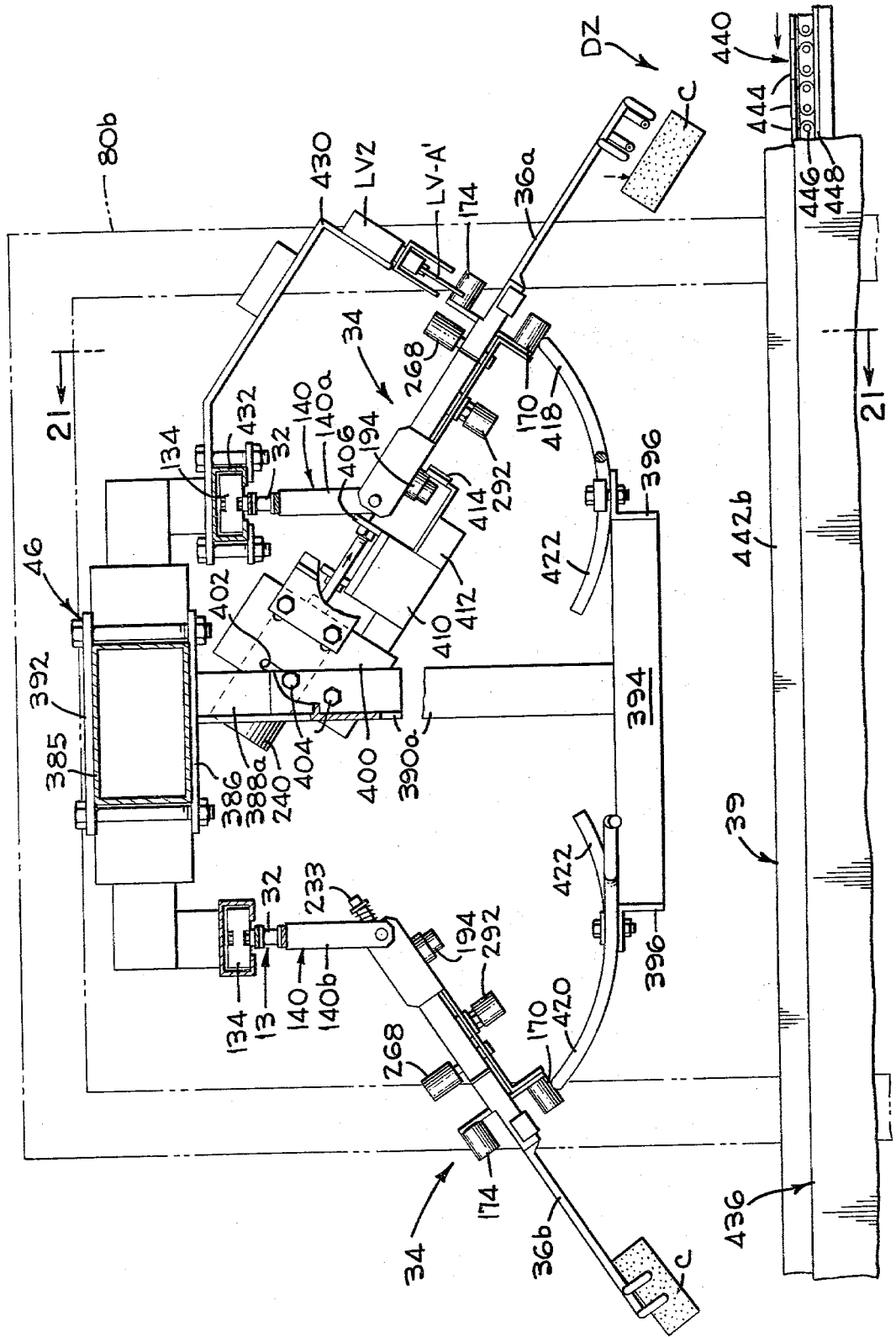

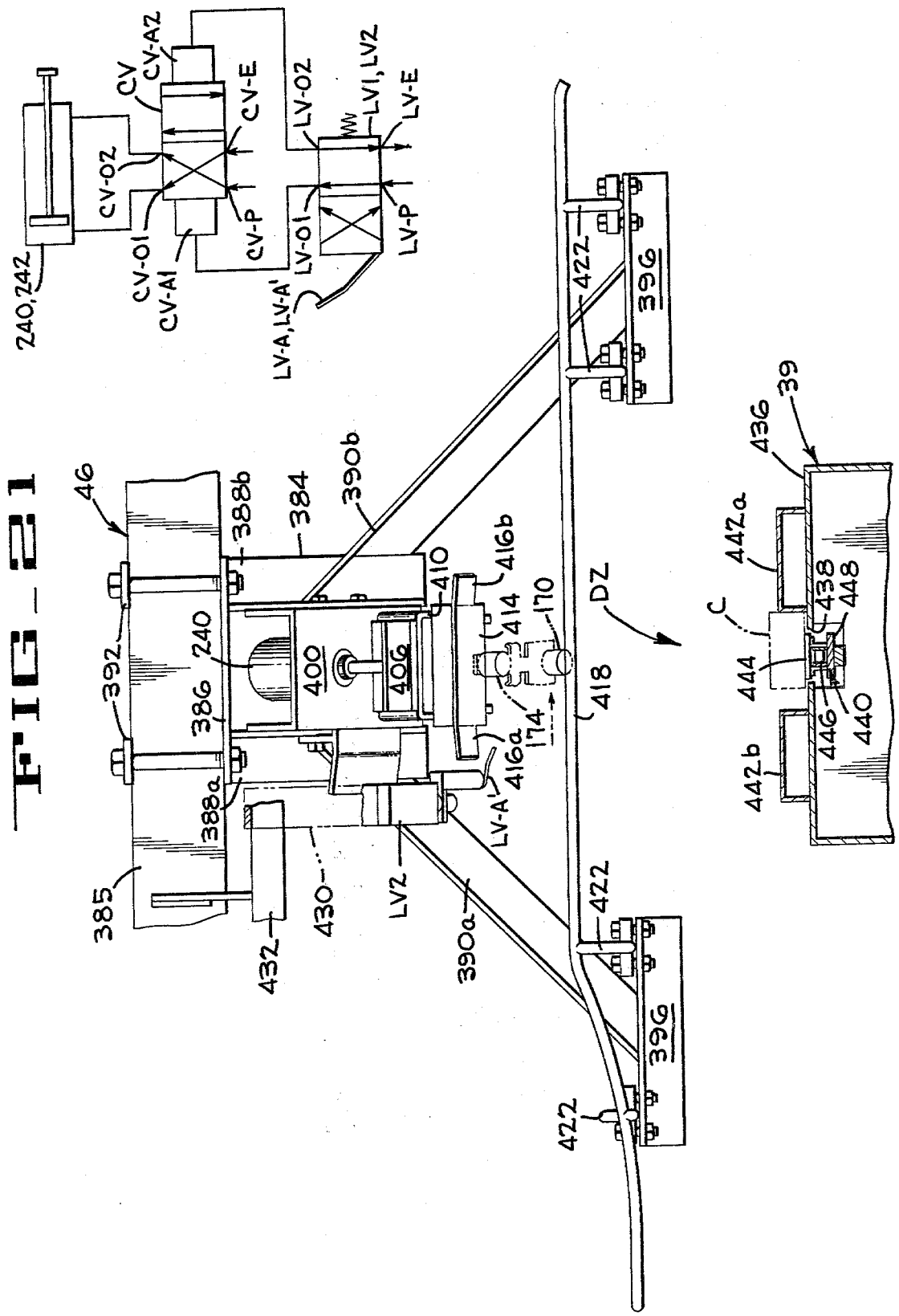

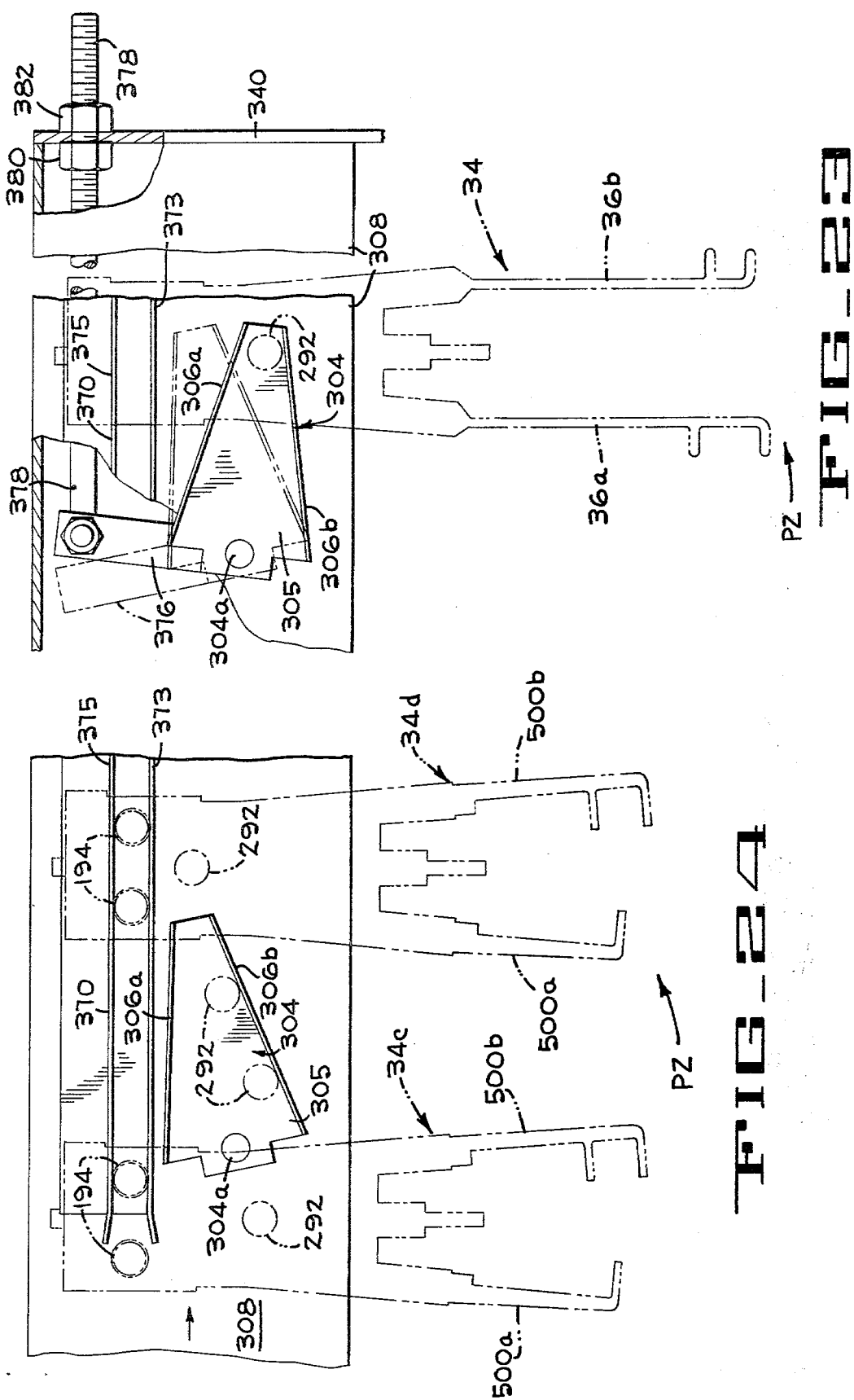

TRANSFER CONVEYOR FOR FROZEN CONFECTIONS

BACKGROUND OF THE INVENTION

1. Field of the Invention

The present invention pertains to conveyors for transferring frozen confections from a conveyor on which such confections are frozen to a position where they can be wrapped or otherwise processed, and more particularly, it pertains to such conveyors which rely upon scissorlike gripping tongs to grasp the confection during the transfer movement.

2. Description of the Prior Art

In the U.S. Pat. No. 3,985,223 to Forcella et al, there is disclosed an apparatus for producing frozen confections without molds in continuously moving processing lines. Such apparatus includes a freezer conveyor which includes a series of plates mounted to an endless chain. The freezer conveyor is arranged under an extrusion nozzle and slicing apparatus which together form a semi-frozen product, such as a slab of ice cream mix. The conveyor then carries the slab into a freezing vault through a spiralled series of runs within the vault until the products are frozen to a very hard consistency. The frozen products are then carried from the vault to the pickup zone of a pickup conveyor. The pickup conveyor includes a large number of carriages mounted in an endless series to form an endless chain. Each carriage includes a pair of tongs and means for scissoring the tongs so as to sequentially and continuously pick up frozen products from the plates of the outlet reach of the freezer conveyor. The frozen products are carried by the respective carriages through various optional accessory devices along the path of the pickup conveyor, such as through an enrober or coating bath for coating the frozen product with liquid chocolate and such as a dry-coating apparatus for subsequently covering the chocolate coated product with ground nuts. As shown in the Forcella et al patent, the overall frozen confection apparatus may further include a stick inserter for making stick-type confections and an extruder which is particularly adapted to make ice cream cones. Another typical confection machine of the same general type as that shown in the Forcella et al patent is that disclosed in U.S. Pat. No. 3,648,625 to Glass.

As noted in the Forcella at al patent, the moldless frozen confection apparatus must be adapted to produce different types of frozen confection products such as the ice cream slabs just described, rectangular frozen stick confections, ice cream sandwiches, ice cream cones, ice cream cups, and irregular novelty bars. Due to the wide range of sizes and configurations of such products, the Forcella et al patent noted that the pickup conveyor is required to include a large assortment of accessories, or changeover parts, to enable the conveyor assembly to handle the various frozen confections. Although the Forcella et al structure made a major contribution toward minimizing the inventory of parts required for the pickup conveyors and toward minimizing the length of time required to refit the pickup conveyor with different parts to handle different confections, the Forcella et al structure has been found to be subject to several shortcomings.

One shortcoming is that the carriages disclosed in the Forcella et al patent have to be individually and separately adjusted to set the distance between the gripping tongs when such tongs are closed upon the confection, such distance being hereinafter referred to as the "closed distance". That is to say, when a different type of confection that has a different width is to be handled by the product conveyor, each of the carriages must be individually adjusted to compensate for the new width of the confections to be picked up. It is noted that such adjustment of the Forcella et al carriages takes a considerable period of time, not only because each carriage has to be individually and directly manipulated but also because the adjustment of each carriage requires that a wrench be applied to a nut that is located at the inner end of the carriage. It will be appreciated by those in this art that these adjustments must accurately reset the closed distances, otherwise the tongs may tend to be either so far apart as not to pick up a product from the freezer conveyor or so closely spaced that the tongs become so deeply embedded in the frozen confection that they do not properly release the confection. In the latter case, when the tongs are opened at the drop station of the pickup conveyor, the confection may be stuck to one or both of the tongs so as to cause it to fall haphazardly onto the underlying takeaway conveyor or miss the conveyor altogether.

Another problem associated with the pickup conveyor in the aforedescribed prior art frozen confection handling systems is that such systems usually require a relatively expensive auxiliary conveyor disposed to receive certain types of confections at the drop station of the pickup conveyor. Such auxiliary conveyor is required except when ice cream cones are being handled. The auxiliary conveyor includes an endless series of contoured, stainless steel buckets which serve to orient the rectangular confections thereof before the confections are subsequently fed to the wrapper conveyor.

A typical wrapper conveyor of the prior systems is shown in the aforementioned Forcella et al patent. It includes an endless belt moving between transversely spaced, downwardly and inwardly sloped platforms; the endless belt has pusher lugs which are longitudinally spaced to receive confections between each adjacent pair of lugs. The auxiliary conveyor was required because the prior are pickup conveyors had carriages and means for opening the tongs of the carriages wherein the tongs could not be so rapidly opened that the product would be released quickly enough to fall in predictable uniform trajectories onto the underlying conveyor. In particular, the carriages of the Forcella et al type of pickup conveyor have been found to be incapable of so quickly releasing the confections that the confections drop in uniform trajectories at the drop zone of the pickup conveyor, thereby requiring the auxiliary transfer conveyor to compensate for irregular delivery before the confections are directed to the wrapping machinery.

Another problem associated with the pickup conveyor disclosed in the Forcella et al patent concerns the proper vertical positioning of the carriages relative to the freezer conveyor plates. In the Forcella et al structure, the pickup conveyor includes a frame that is vertically adjustable by means of several jacks, a chain for operating the jacks, and a crank for driving the chain. When it is desired to switch from a type of confection requiring one set of tongs to a confection requiring another set of tongs, in addition to making the aforementioned adjustment in the closed distances of the tongs, it is further necessary to manipulate the crank to adjust the height of entire pickup conveyor frame relative to the freezer conveyor so that the tongs of the carriages come into the desired registry with the sides of the new type of confections to be handled. Although such jack and crank arrangement of the Forcella et al system has been found to be generally satisfactory, it will be recognized that such arrangement is relatively costly and complex.

Yet another problem associated with this prior art pickup conveyor has to do with the infrequent, but very troublesome, problem of confections sticking to the plates of the freezer conveyor. As indicated in the Forcella et al patent, the freezer conveyor is provided with vibrating means below the outlet reach (upstream from the pickup zone of the pickup conveyor) to beat the undersides of the plates to loosen any confection which had become stuck to a freezer plate. It will be understood that such vibrating must be limited so that the confections are not shifted on the plates. Occasionally, such beating did not loosen all of the frozen confections from adherence to the plates. In such an event the stuck confection sometimes so tenaciously adheres to the supporting plate that the tongs of the pickup carriage fail to lift the confection from the plate. In the worst case, the tongs have become so embedded in a frozen-hard confection that damage has occurred to the carriage as a result.

SUMMARY OF THE INVENTION

The present invention contemplates an improved pickup or transfer, conveyor for use in removing frozen confections from a continuously moving freezer conveyor and for dropping the confections at a drop station, such improved conveyor being specifically designed to overcome the aforementioned problems. The transfer conveyor of the present invention includes a large plurality of carriages mounted in an endless series, each carriage including tongs which are movable between a closed position adapted to grip a confection and an open position adapted to release the confection and to receive a new confection. The tongs are operated by a mechanism which has an adjustable stop assembly which enables the closed position of the tongs to be very quickly and accurately adjusted to reset the closed distance of the tongs without directly or independently manipulating each carriage. This adjustable stop assembly includes a member projecting outwardly of the carriage which is arranged to be engaged by a deflector mounted in a stationary position to the frame of the machine whereby the closed distances of the carriages are adjusted automatically in sequence as the projecting members pass the deflector. The deflector member can be repositioned to set to stop assemblies of all of the carriages in different positions.

In a preferred embodiment of the pickup conveyor of the present invention, the carriages each include a carriage frame, tongs which are independently pivotally mounted at their inner ends to the carriage frame and a wedge which is reciprocatable between the tongs and which, when pushed forwardly toward the outer ends of the tongs, causes the tongs to open. The tongs are biased inwardly by springs, and the wedge is mounted on a push rod which extends longitudinally of the carriage frame. The rearward movement of the wedge and interconnected push rod is arrested at selected positions by the stop assembly. To provide for very rapid opening of the tongs so as to cause the confections to drop in uniform trajectories, a striker member which acts in a straight line path is provided at the drop station to strike the inner end of each of the push rods in succession to cause the wedges to outwardly pivot the tongs and thus quickly release the confections.

Another aspect of the present invention relates to the means for adjusting the vertical position of the carriages relative to the plates in the outlet reach of the freezer conveyor. Preferably, each carriage is pivotally mounted at its inner end to the pickup conveyor, and each carriage includes a support roller. Such support roller is supported at the pickup station by a track arrangement mounted to the frame of the machine. The track arrangement includes a first portion for downwardly pivoting the carriages before they reach the point above the freezer conveyor where the arms are to be closed upon a confection. A second portion permits the carriages to extend in the path of travel of the plates of the freezer conveyor so that the confections can be received by the carriages. Downstream of the confection pickup point is a third track portion that is upwardly inclined so that it raises the carriages to thereby lift the confections from the freezer conveyor. The third track portion is pivotally mounted to the frame of the machine so that when the confection grasped by a carriage is stuck to the freezer conveyor, the portion may pivot downwardly. A sensor is positioned relative to the track portion so as to be actuated by the track portion when it is so pivoted to trigger a striker mechanism which will actuate the push rod and wedge to release the stuck confection from the carriage and thereby present damage to the carriage.

BRIEF DESCRIPTION OF THE DRAWINGS

FIG. 1 is a diagrammatic top plan which illustrates the improved transfer conveyor of the present invention as incorporated in an apparatus for producing confections without the use of molds.

FIG. 2 is an enlarged, somewhat diagrammatic top plan of the portion of the transfer conveyor at the pickup zone thereof, the portion of the freezer conveyor from which the frozen confections are removed being also diagrammatically illustrated.

FIG. 3 is a section taken on line 3—3 of FIG. 2.

FIG. 3A is an enlarged fragmentary, sectional view that shows the structure of one of the idler sprockets of the transfer conveyor.

FIG. 4 is an enlarged section taken on line 4—4 of FIG. 2 and further illustrating a carriage on the transfer conveyor.

FIG. 5 is an enlarged section taken on line 5—5 of FIG. 4.

FIG. 6 is an enlarged top plan of one of the carriages of the transfer conveyor, wherein the tongs thereof are shown in their open position under the influence of a cam rod shown in phantom outline therein; this view also shows in phantom outline another cam rod disposed below the carriage which is adapted to support the carriage in an upwardly tilted orientation at the pickup zone.

FIG. 7 is a section taken on line 7—7 of FIG. 6.

FIG. 8 is an enlarged section taken on line 8—8 of FIG. 7.

FIG. 9 is a reduced section taken on line 9—9 of FIG. 8.

FIG. 10 is an enlarged fragmentary section taken on line 10—10 of FIG. 9.

FIG. 11 is a top plan of a carriage of the conveyor which shows the tongs in their open position preparatory to grasping a confection and with the cam rods which operate the tongs and control the tilt of the carriage being shown in phantom outline.

FIG. 13 is a top plan of a carriage similar to FIG. 11 but taken at a point downstream from that of FIG. 11 wherein the arms are in their closed position engaging a confection and in the process of lifting it from the freezer conveyor.

FIG. 13 is a top plan of an alternative form of carriage that has been provided with different tongs that are suitable for grasping the stick of a stick type of frozen confection, the carriage being shown with the tongs in their closed position tightly engaging the stick of the frozen confection.

FIG. 14 is an enlarged section taken on line 14—14 of FIG. 2 further illustrating a carriage and the elements of an underlying stuck product release mechanism wherein a confection has been lifted from the freezer conveyor.

FIG. 15 is an enlarged, fragmentary side elevation that illustrates a carriage and the elements of the stuck product release mechanism in the positions assumed when a confection that has stuck to the freezer conveyor has been grasped by a carriage.

FIG. 16 is a section similar to that of FIG. 14 but illustrating the carriage and elements of the stuck product release mechanism when, as in FIG. 15, a confection that has stuck to the freezer conveyor has been grasped by the carriage so as to depress the pivotable cam rod of the stuck product release mechanism.

FIG. 17 is an enlarged section taken on line 17—17 of FIG. 2 wherein the subsequent downwardly hanging orientation of the carriage is illustrated in phantom outline.

FIG. 18 is an enlarged section taken on line 18—18 of FIG. 2 and illustrates in phantom outline the preceding orientation of a carriage before it has been upwardly tilted by the track rod.

FIG. 19 is an enlarged side elevation taken in the direction of the arrows 19—19 of FIG. 2 which illustrates the movement of the carriages downstream from the pickup zone.

FIG. 20 is a sectional view taken through the transfer conveyor at the drop zone thereof, such view further illustrating a portion of the wrapper conveyor which extends below the transfer conveyor at the drop zone.

FIG. 21 is a section taken on line 21—21 of FIG. 19, with the carriage being removed for the sake of clarity.

FIG. 22 is a schematic diagram of the pneumatic control circuitry for the transfer conveyor.

FIG. 23 is an enlarged fragmentary top plan which illustrates the deflector, which is mounted to the frame of the transfer conveyor, in an outwardly pivoted position suitable for setting the friction stop devices of the carriages at positions suitable for handling stickless products, the inwardly extended position of the deflector which is suitable for handling stick type products being shown in phantom outline.

FIG. 24 is a top plan similar to FIG. 23 showing a pair of adjacent carriages and illustrating the cooperation between the deflector and the friction stop assembly that is mounted on each carriage.

BRIEF DESCRIPTION OF THE PREFERRED EMBODIMENT

General Description

Referring now more particularly to FIG. 1, an apparatus for continuously producing frozen confections without the use of molds will be seen to include a freezer vault 10, a freezer conveyor 11 comprised of a series of plates 12, and a transfer conveyor 13 that is adapted to pick up frozen confections C (FIG. 2) from the outlet reach 14 of the freezer conveyor 11.

The vault 10 preferably includes the heat exchanger and spiralled, conveyor run arrangement shown and described in copending United States patent application Ser. No. 918,521 filed on June 23, 1978 by Tumey et al, which patent application is assigned to the assignee of the present application. The disclosure of such copending application is incorporated herein by reference. The freezer vault has an insulated outer wall 15 provided with an outlet opening 15a through which the outlet reach 14 of the freezer conveyor moves and an inlet opening 15b through which the inlet reach 16 of the freezer conveyor moves. An extruder and slicer unit 17 is disposed above the inlet reach 16 generally opposite from the pickup zone of the transfer conveyor. The extruder and slicer unit 17 is preferably of the type illustrated and described in U.S. Pat. No. 3,981,660 to Forcella et al. The extruder and slicer unit sequentially, in timed relation to the movement of the freezer conveyor, forms confection bars C on the freezer conveyor in a manner to deposit pairs of such frozen confections on each freezer plate 12, as shown in FIG. 2. A stick inserter 18 may be provided to insert sticks into the semifrozen confections. It is noted that various types of frozen confections may be formed by the apparatus including those mentioned hereinafter but, except for the description of the process of changing the transfer conveyor to handle a different type of confection (which is described herein at the end of this section), the preferred embodiment of the transfer conveyor will be described only in connection with the handling of confections of the stickless bar type.

As shown in FIGS. 2 and 4, the freezer plates 12 are cantilevered at their inner ends to an endless claim 19 that is entrained on a drive sprocket 20 (FIG. 2) mounted on a drive shaft 21. A further sprocket is mounted on the shaft 21 below the sprocket 20, and a drive chain 22 is entrained on such sprocket. The chain 22 is entrained on a sprocket mounted on the output shaft of a first gear box 23. The input shaft of the gear box 23 is directly connected to a suitable AC electric motor 24 which is operated continuously. A belt 25 is operatively connected between the output shaft of the motor and a line shaft 26. A second gear box 27 is driven by another belt 28 entrained on a pulley affixed to the line shaft 26. A sprocket is mounted on the output shaft of the gear box 27, and a chain 29 is entrained on such sprocket and also on a drive sprocket 30 mounted on a drive shaft 31 (FIG. 3). With such a drive arrangement, the transfer conveyor 13 is continuously driven in timed relationship with the freezer conveyor 11.

As shown in FIGS. 1 and 2, the transfer conveyor 13 includes an endless chain 32 which moves along a path between a pickup zone PZ situated at the downstream end of the outlet reach 14 of the freezer conveyor 11 and a drop zone DZ situated above a wrapper conveyor 39 (FIGS. 1, 20 and 21). The endless chain 32 is entrained on a sprocket 33a mounted above the drive sprocket 30 and a series of idler sprockets 33b through 33i which are mounted to the modular main frame structure of the conveyor, such sprockets being shown in FIG. 1. A large number of carriages 34 (in excess of 140 carriages for the length of transfer conveyor shown) are pivotally mounted to the endless chain 32 in closely spaced relationship thereon with such spacing corresponding to the distance between the confections C as deposited on the plates 12 of the freezer conveyor. Each of the carriages includes a pair of tongs 36a and 36b which can be scissored together to grip the frozen confections C, lift them from the freezer plates 12, and carry them from the pickup zone PZ along the path defined by the endless chain 32 to the drop zone DZ.

An enrober 37 and a dry coater 38 are positioned along the path between the pickup zone PZ and the drop zone DZ. The enrober 37 is adapted to coat each confection C grasped by the tongs 36a and 36b with a liquid coating such as chocolate. The dry coater 38 is disposed downstream from the enrober by a sufficient distance to let the coating on the confection dry somewhat before reaching the dry coater. The dry coater is adapted to apply ground material, such as ground nuts, to the coated ice cream confection.

After the confections have been so coated, they are moved through a drying leg of the transfer conveyor 13 and subsequent thereto arrive at the drop zone DZ where they are so released as to fall in uniform trajectories onto the wrapper conveyor 39, which conveyor extends transversely under the transfer conveyor 13. At the drop zone, the tongs 36a and 36b of the carriages 34 are opened quickly to insure that the confection C will fall in uniform trajectories onto the wrapper conveyor.

After the confections have been released onto the wrapper conveyor 39 at the drop zone DZ, the carriages are moved through a sprayer unit 41 which is adapted to clean the tongs 36a, 36b thereof in preparation for handling further confections in the manner as just described.

Modular Frame Of The Transfer Conveyor

As illustrated in FIG. 1, the modular frame of the transfer conveyor 13 is comprised of a pickup station section 40 which has a triangular outline in top plan; a coupling section 42 which has a right angle configuration in top plan and which has one end removably connected to the apex of the pickup station section 40; a further coupling section 44 which has a dog-leg shape in top plan and has one end connected to the projecting end of the coupling section 42; a relatively long straight section 46 which has one end detachably connected to the other end of the dog-leg shape section 42; another coupling section 47 also having a dog-leg shape in top plan and having one end thereof connected to the other end of the straight section 46; and a relatively short straight section 48 which is detachably connected to the coupling section 47. Now referring to FIG. 2, the pickup station section 40 will be seen to include a front beam 50, which is parallel to the freezer conveyor outlet reach 14, and side beams 52 and 54 which converge from the ends of the beam 50 at an apex 56 to which a bolting plate is mounted. The coupling section 42 comprises a tubular beam including a first section 58 and a second section 60 which extend perpendicularly from the end of the first section 58. The other sections of the pickup conveyor frame include main beams, comprised of rectangular tubular members, which extend horizontally, and all of the main beams of the sections have bolting plates at their ends which enable them to be detachably connected by bolts (not illustrated) to the adjacent sections.

Referring to FIGS. 2-4, it will be seen that the pickup station section 40 of the modular main frame includes a tubular column 66 extending perpendicularly downwardly from the beam 50 and an angle iron 68 which also extends perpendicularly downwardly from the beam 50 (FIG. 2). A beam 70 is affixed to the lower ends of the beam 66 and angle iron 68. A further pair of beams 72 and 74 (FIGS. 2 and 3) project perpendicularly outwardly in the direction of the freezer conveyor 11 from the lower beam 70 adjacent the lower ends of the support members 66 and 68, respectively. As illustrated in FIG. 4, the beams 72 and 74 are connected to the main frame 76 of the freezer conveyor. As shown in FIG. 3, and in dotted lines in FIG. 2, a tubular column 79 depends perpendicularly from the beam section 58 of the couplins section 42. Thus, the pickup station section 40 is supported above the floor at its front end by its connection to the frame 76 of the freezer conveyor and at ist rear end by the coupling section 42 which, in turn, is supported by column 79.

Again referring to FIG. 1, it is diagrammatically shown therein that three pedestals 80a, 80b and 80c are connected to the straight section 46 of the transfer conveyor frame. The short section 48 at the outer end of the frame is carried by two pedestals 82a and 82b. Although not illustrated in the Drawings, such pedestals include posts on either side of the main beam of the sections 46 and 48 and a horizontal beam extending between such posts to which the main beam of the respective sections is secured.

Transfer Conveyor Chain Arrangement

The sprocket 33a is mounted to the modular frame of the transfer conveyor to drive the chain in a horizontal plane which is above the freezer conveyor 11. The idler sprockets 33b–33i are all of identical construction, so therefore the following description of the mounting of the idler sprocket 33i (FIGS. 1 and 2) will be understood to apply also to the other idler sprockets 33b–33h. As shown in FIG. 3A, the sprocket 33i is journalled on a shaft 90 which depends perpendicularly from the beam 50 adjacent the end thereof. Collars 92 and 94 are welded to the upper and lower surfaces of the beam 50, and the shaft 90 is affixed within such collars. The sprocket itself includes a sprocket plate 96 which is bolted between a pair of bearings 98 and 100. Each of the bearings 98 and 100 includes a collar portion which enables the sprocket assembly to be rotatably mounted at the lower end of the shaft 90.

The other idler sprockets 33b–33h are mounted to the transfer conveyor frame structure by means of horizontally extending beams as shown in FIG. 1. The idler sprocket 33b that is immediately downstream from the drive sprocket 33a is mounted at the end of a short beam 102 which projects perpendicularly from the side of the beam section 58 of the right angle section 42 (FIG. 2). The sprocket 33h that is upstream from the sprocket 33i is mounted at the corner of the frame section 42. The dog-leg shaped coupling section 44 has a short beam 104 extending perpendicularly therefrom, and the sprocket 33c which is immediately downstream from the sprocket 33b is mounted to the short beam 104. The sprocket 33g is mounted at the bend of the section 44. The dog-leg shaped coupling section 47 also has a short beam 106 extending therefrom to which the sprocket 33d that is down from the sprocket 33c is mounted. The sprocket 33f that is upstream from the sprocket 33g is mounted at the bend of the section 47. Finally, the idler sprocket 33e is mounted at the end of a short beam 108 which is detachably connected at the end of the straight section 48. The conveyor chain 32 will be seen to reverse its direction of travel as it traverses the end sprocket 33e.

The drive sprocket 33a illustrated in FIGS. 2 and 3, is mounted on the drive shaft 31 as previously explained. The shaft 31 is received at ist upper end within a bearing 112 and adjacent its lower end within another bearing 114. The bearing 112 is secured at the end of the upper beam 50, and the bearing 114 is secured to the end of the lower beam 70. As previously stated, the drive sprocket 30 is fixed to the lower end of the shaft 31, the drive chain 29 is entrained on the drive sprocket, and the drive chain is driven by the second gear box 27 in timed relation with the drive chain of the freezer conveyor 11.

The runs of the endless chain 32 of the transfer conveyor 13 between the sprockets 33a-33i are guided by a supported within guide channels. In FIG. 2, a support channel 116 is shown to extend between the sprockets 33h and 33i to support the chain in such location. This chain guide is supported by brackets 118 and 120 which are mounted to the beam 52 of the frame section 40. Another chain guide channel 122 is positioned between the sprockets 33a and 33b and is similarly mounted by brackets 124 and 126 to the other side beam 54 of the frame section 40 (see FIG. 19). A further guide channel 128 (FIGS. 2, 3 and 4) is mounted forwardly of the beam 50; such channel 128 stabilizes the chain at the pickup zone of the transfer conveyor. The channel 128 is supported by brackets 130 and 132 from beam 50. The bracket 130 (FIG. 4) is welded to the underside of the beam 50 and is connected at its outer end to an overlying bracket 133. The inner end of the bracket 133 is welded to the beam 50, and such bracket slopes downwardly from the beam 50 and then drops vertically downwardly (such bracket 133 supports a cam rod 360, as will hereinafter be described). The other support bracket 132 (FIG. 2) for the channel 128 is attached to the beam 50 and the angle iron 68.

Such guide channels 116, 122 and 128 support and guide a chain guide block 134 of plastic which is associated with each carriage 34. As shown in FIGS. 4 and 5, each carriage 34 of the transfer conveyor is pivotally mounted to a U-shaped bracket 140 which is secured to the guide block 134 below the endless conveyor chain 32. As shown in FIG. 5, each guide block has a groove 138 formed in its upper surface, and a pair of bolts 136 extend through apertures (aligned with such groove) and through rollers of the chain 32 and also through the upper end of the bracket 140 to which they are secured by nuts. The heads of the bolts 136 are recessed within the groove 138. The bracket 140 has a U-shape including two legs 140a and 140b (FIG. 5), and pins 142a and 142b are mounted to the legs 140a and 140b, respectively, to extend perpendicularly therefrom counter to the direction of travel of the chain, as indicated by the arrow in FIG. 5. The leading pin 142b is longer than the trailing pin 142a for the purpose of facilitating the mounting of the carriage 34 on the bracket. The carriage is retained on the bracket by means of a snap ring 146 mounted to one of the pins. It will be understood that the carriages are pivotable relative to the bracket to which they are connected about an axis A—A (FIG. 5) extending through the pins 142a and 142b, such axis being parallel to the chain 32. As will be hereinafter pointed out, the carriages 34 normally vertically depend from the brackets 140 (as shown in FIG. 19 and also in phantom outline in FIG. 17).

Transfer Conveyor Carriages

The carriages 34 are all of an identical construction which is illustrated in FIGS. 6–10. Each carriage includes a frame 150 fabricated from sheet metal. The carriage frame 150 includes a flat bottom wall 152, a flange 154 extending downwardly at the front end of the wall 152, a rear wall 160 having an aperture 162 formed centrally therein, and a top flange 164 is formed at the upper end of the rear wall 160, such flange extending forwardly parallel to the bottom wall. A pair of side walls 156a and 156b are secured to an extend perpendicularly upwardly from the side edges of the bottom wall 152 at the rear end thereof. As can be seen in FIG. 6, a slot 166 is formed longitudinally in the center of the bottom wall 152. An upstanding frame member 168 fabricated from sheet metal, is affixed to the flange 154 at the front of the frame, its particular construction to be hereinafter described in detail.

As previously described, the carriages 34 are arranged to be pivotally mounted to the U-shaped brackets 140 seen in FIG. 5. Bores are formed in the rearward ends of side walls 156a and 156b to be received over the pins 142a and 142b, respectively, of a bracket 140, and the retainer clip 146 prevents the carriage from slipping off of the support bracket.

Referring next to FIGS. 7 and 8, it will be seen that a roller 170, made of a plastic such as nylon, is mounted to the lower end of the frame member 168. Such roller will be hereinafter referred to as the lower support roller because it suppports the front end of the carriage as the carriage moves over the rod type track arrangement (described hereinafter). The roller 170 is mounted on a shouldered bolt 172 (FIG. 7) which extends through a bore formed in the roller and abuts against the plate 168. Another roller 174 is mounted in the same manner to a tab portion 178 (FIG. 8) formed at the upper end of the frame member 168, such roller being adapted to support the carriage as it moves through the enrober 37 and also to engage a limit switch at the drop zone DZ. As shown to FIG. 8, opposing slots 174a and 174b are formed transversely in the member 168 immediately above the bottom wall 152, and transversely extending fingers 180a and 180b are formed immediately above the slots 174a and 174b, respectively. The fingers 180a, 180b are bent rearwardly so as to diverge at the same angle with a plane through the centerline C—C of the carriage (FIG. 6). The fingers 180a and 180b provide sliding support for a pair of opposed channel-shaped arms 182a and 182b, respectively, to which the tongs 36a and 36b of the carriage are respectively mounted.

As just indicated, each carriage 34 includes a pair of arms 182a and 182b to which the tongs 36a and 36b are mounted. The tongs are detachably mounted to the outer ends of the arms by fixed spring-clips 178a and 178b. Such detachable mounting arrangement is fully described in the copending patent application, Ser. No. 045,041 filed June 4, 1979 by S. D. Cross and entitled Improved Confection Conveyor; the disclosure of this copending patent application is incorporated herein by reference.

The tong-receiving arms 182a and 182b are pivotally and independently mounted to the carriage frame on pins 186a and 186b, respectively. The pins 186a and 186b extend through aligned apertures in the bottom wall 152 and the top flange 164 of the carriage frame member 150. As shown in FIG. 7 each of the pins is secured to the carriage frame by a nut 190 at its upper end, the lower end thereof being of a larger diameter so as to abut against the underside of the bottom wall 152. A stepped roller 194 (only one shown in FIG. 7) having a larger upper surface 196 and a smaller lower surface 198 is received on the lowermost end of each pin, such stepped rollers being hereinafter referred to as brace rollers. Plastic washers 200 and 202 are received on the pins above and below the respective tong-receiving arms 182a and 182b.

The tong-receiving arms 182a and 182b are of mirror image constructions (relative to a plane through the center line C—C of the carriage, FIG. 6). As depicted in FIGS. 6, 8 and 9, the arms are formed from a channel having a U-shape in cross-section and are mounted to open inwardly toward each other. Each arm has a top wall 206, a bottom wall 208, and an outer wall 210 (FIG. 8). Rollers 212a and 212b are mounted within the arms 182a and 182b on pins 214a and 214b, respectively. The rollers 212a, 212b are positioned about midway between the front and rear ends of the arms, and they are adapted to be engaged by the arms of a wedge which spreads the arms, as will be described hereinafter. As best shown in FIG. 8, the fingers 180a, 180b project into the channel-shaped opening of the arms 182a, 182b and have a height which is slightly less than that of the distance between the top and bottoms walls of the arms so to support the front ends of the arms particularly when the confections C are picked up from the plates of the freezer conveyor. The fingers 180a, 180b thus prevent the cantilevered tong-receiving arms 182a, 182b from unduly bending downwardly as the confections are removed from the freezer conveyor 11.

As shown in FIGS. 6 and 10, the tong-receiving arms 182a and 182b are biased inwardly toward each other by leaf springs 216a, 216b, respectively. The rear end 218 of each leaf spring (FIG. 10) is inwardly flanged, and such flanged end is engaged within a slot 220 formed in the rear end of the outer wall 210 of each arm. The front end 222 and each leaf spring is outwardly curved so that is may slide on the outer wall of the arm at a position well in front of the side wall 156a, 156b of the carriage frame. Each leaf spring is outwardly bowed and the center thereof abuts against the forward edge of the associated side wall 156a, 156b. FIG. 10 illustrates the open position of the arm 182a and leaf spring 216a in solid lines and illustrates the closed, inwardly pivoted position of the arm and the corresponding position of the leaf spring in phantom lines. the tong-receiving arms will thus be seen to be not only separately and independently pivotable on their respective pivot axes through the pins 186a and 186b but also to be independently biased inwardly by the springs 216a, 216b.

An important aspect of the present invention relates to the means for rapidly opening the tongs 36a and 36b to thereby quickly release a confection C engaged thereby. Generally, the arm opening means comprises a wedge assembly 230 that is secured to a reciprocatable push rod 232 to engage the rollers 212a, 212b on the arms 182a, 182b so as to scissor the arms outwardly as the push rod is forced forwardly on the carriage frame. The push rod 232 is mounted to reciprocate along an axis which is equidistant between the tong-receiving arms 182a, 182b and which is generally coincident with center line of the carriage frame, as is shown in FIG. 6. It should be noted at this point that the rear end 233 of the push rod projects outwardly from the rear end of the carriage frame 150 (that is, beyond the rear edges of the side walls 156a, 156b). As will be described in detail later herein, at the product drop zone DZ, a pneumatic cylinder 240 (FIG. 20) is actuated to strike the rear end 233 of the push rod to reciprocate the rod forwardly and thereby rapidly expand the arms and thus disengage the tongs 36a, 36b from the sides of the confection which they are supporting. It should also be noted at this point of the description that a further pneumatic cylinder 242 (FIG. 16) is positioned at the product pickup zone PZ to strike the rear end 133 of the push rod and rapidly open the tongs in the event that the grasped confection is stuck to the freezer plate 12 of the freezer conveyor, such arrangment also being more particularly described hereinafter.

It will be seen from FIG. 7 that the push rod 232 extends through a bushing 244 mounted in an aperture formed at the center of the member 168 at the front end of the carriage frame 150. The rear portion of the push rod extends through an aperture in a place 246 which is affixed between the top flange 164 and the bottom wall 152 of the carriage frame. The front end of the push rod extends well forward of the front end of the carriage frame and has a screw driver detent 248 (FIG. 6) formed therein, for reasons hereinafter described. In addition to the leaf springs 216a, 216b which bias the tong-receiving arms 182a, 182b against the wedge assembly 230, a coil spring 250 is mounted on the rear portion of the push rod between the plate 246 and a retainer clip 252. The coil spring extends through the aperture 162 formed in the wall 160 at the rear end of the carriage frame.

The wedge assembly 230, which is secured to the push rod 232, includes a member fabricated from sheet metal to include rearwardly diverging wedge fingers 256a and 256b adapted to engage the rollers 212a, 212b of the tong-receiving arms 182a and 182b, respectively (FIGS. 6, 7 and 9). The wedge assembly further includes a front wall 258 (FIG. 7) and a tab 260 extending rearwardly from the upper end of the front wall 258 between the wedge fingers 256a and 256b. The front wall 258 has an aperture 262 (FIG. 7) formed therein through which the push rod extends. The tab 260 also has an aperture 264 therein for receiving a block 266 upon which a wedge-operating roller 268 is mounted. The wedge-operating roller is mounted for free rotation upon a pin portion 267 formed at the upper end of the block 266. A bore is formed in the block 266 at a right angle to the pin, and the push rod extends through such bore. The front portion of the push rod is smaller in diameter than its rear portion so as to form a shoulder against which the rear surface of the block 266 abuts. The block 266, and thus the entire wedge assembly 230, is secured to the push rod by a retainer clip 274 at the front side of the block. The lower end of the wedge block projects through the longitudinal slot 166 formed in the bottom wall of the carriage frame, whereby the block slides within the slot when the push rod reciprocates and prevents the wedge assembly from twisting.

As will be explained more fully hereinafter, as a carriage 34 is carried into the pickup zone PZ, the wedge-operating roller 268 is forced forwardly on the carriage frame 150 by an upper cam rod 360 (FIG. 2 and in phantom outline in FIGS. 6, 7 and 8) to thereby cause the wedge fingers 256a, 256b to open the tong-receiving arms 182a and 182b in a scissor-like manner. Since the push rod 232 is biased rearwardly by the coil spring 250, and also by the leaf springs 216a and 216b (acting through the wedge fingers), when the rod 360 curves inwardly to permit the wedge-operating roller to retract, the tong-receiving arms, and thus the tongs 36a and 36b connected thereto, will close onto a confection C. The closed position of the tongs must be therefore adjusted according to the width of the confection to be picked up. Such closed position is adjusted by a mechanism including a friction stop assembly 278 reciprocatably mounted to the frame 150 of each carriage within the slot 166 in the bottom wall 152. The friction stop assembly 278 includes a stop bracket 280 that has a slot in its upper end through which the push rod 232 may freely move. The stop bracket 280 is arranged to engage a locknut 284 that is adjustably received on a threaded portion of the push rod (FIG. 7). The locknut 284 is positionably adjustable on the push rod to permit each carriage to be calibrated to compensate for varying tolerances in their manufacture. It is emphasized that the adjustability function of the locknut 284 is not to vary the closed distances of the tongs 36a, 36b in the process of switching the transfer conveyor from handling one type of confection to the handling of a wider (or narrower) confection, for this function is served by the adjustable mounting of the friction stop assembly as will be described hereinafter. The position of the locknut 284 on the push rod is adjusted by engaging a screw driver in the slot 248 at the front end of the push rod, and turning the push rod while holding the locknut in place with a wrench. As will be described next, the closed distances of the tongs 36a, 36b are reset for different types of confections by adjusting the longitudinal position of the stop bracket 280 on the carriage frame. By positioning the stop bracket farther from the pivot axes of the tong-receiving arms 182a, 182b, the closed distances are correspondingly increased.

As may be seen in FIG. 7, the stop bracket is mounted on a relatively large upper end of a pin 286 which projects through the slot 166 in the carriage frame. The pin has an intermediate portion which is threaded and has a diameter smaller than that of the upper portion of the pin. The pin has a reduced diameter lower end to which a roller 292 is mounted. An upwardly convex, annular washer 294 is mounted on the upper end of the pin against the bottom of the stop bracket 280. A washer 296 made of plastic is positioned between the convex washer 294 and the upper surface of the bottom wall 152 of the carriage frame, and another plastic washer 298 is disposed below the bottom wall of the carriage frame to slide thereagainst. A metal washer 300 is positioned below the lower plastic washer 298, and a nut 302 is received on the threaded portion 288 of the pin below the washer 300. The nut 302 is tightened sufficiently to prevent the entire function stop assembly 278 from moving rearwardly on the carriage frame under the pressure of the coil spring 250 and the leaf springs 216a, 216b. However, the nut is only tightened enough so as to exert frictional forces on the bottom wall of the carriage frame which may be overcome so that the stop assembly may be slid relative to the carriage frame by a deflector 304 (FIG. 2) which is arranged to selectively engage the roller 292.

The positions of the friction stop assemblies 278 of the respective carriages are sequentially and automatically adjusted, if and as desired, as the carriages move through the pickup zone PZ of the transfer conveyor. The roller 292 of the friction stop assembly extends perpendicularly outwardly from the carriage frame 150, and such roller is adapted to cooperate with the deflector 304 to reset the position of the stop assembly on the carriage frame. The deflector includes a bottom wall 305 and upstanding deflector walls 306a and 306b which converge toward each other in the direction of travel of the carriages as best seen in FIGS. 23 and 24. The downstream ends of the deflector walls 306a, 306b are sufficiently spaced to permit the rollers 292 of the carriages to travel therethrough. The deflector is pivotally mounted upon a table 308 that is mounted to the pickup station frame section 40 of the transfer conveyor. More particularly, the deflector is pivotally mounted to the table 308 to pivot about an axis located intermediate of the upstream ends of the deflector walls 306a, 306b. If it is desired to change the position of the friction stop assemblies and thus the closed distances of the tongs 36a, 36b, the deflector is pivoted so that one of the deflector walls is brought into the path of travel of the rollers 292 whereby such wall will sequentially cam the rollers of all of the carriages outwardly (wall 306a) or inwardly (wall 306b) as the carriages move over the deflector. In this manner, the stop assemblies of the carriages are sequentially adjusted to reset the closed distances of the tongs at the desired setting for the new type of confection. The description of the pivotal mounting arrangement for the deflector is provided hereinafter in connection with the description of the operation of the transfer conveyor.

Support Rods For Tilting The Carriages

It will be seen from FIGS. 2-4 that, as the carriages 34 are moved around the pickup station frame section 40 of the transfer conveyor, they are tilted to various angles with the horizontal by an arrangement of contoured support rods, or tracks, 310, 312, 326, 346, 352 and 356 which in top plan (FIG. 2) have a generally triangular outline. The lower support roller 170 of each carriage rides upon the support rods to provide a smooth pivoting of the carriages relative to their respective mounting brackets 140. This arrangement of support rods includes a first rod 310 that, in top plan (FIG. 2), intersects a path of travel of the endless chain 32 as it moves through the guide channel 116 and, in elevation (FIG. 18) extends upwardly in the direction of travel of the endless chain, thereby tilting the carriages upwardly to an angle above the horizontal when the carriages are at the downstream end of the rod prior to making their turn into alignment with the freezer conveyor 11 (FIG. 2). Referring to FIG. 3, it will be seen that the second support rod 312 is disposed downstream of the first support rod 310 and has an upstream portion 314 which is horizontal and aligned with the horizontal downstream portion of the first support rod 310. The second support rod 312 includes an intermediate portion 316 which slopes downwardly from the upstream portion 314 and a downstream portion 318 that is straight and extends in a horizontal plane parallel to the freezer conveyor. The downstream portion 318 of the support rod 312 is below the level of the plates 12 of the freezer conveyor (FIG. 4) and is generally at a height such that a carriage supported thereon will be tilted slightly above the horizontal whereby the tongs 36a, 36b generally register with the sides of the confection as shown in FIG. 4. The first support rod 310 thus upwardly tilts the carriages to inclinations substantially above the horizontal (FIG. 18), and the second support rod 312 carries the carriages in such upwardly tilted orientations around the idler sprocket 33i and then lowers them on a downwardly sloped portion 316 thereof over the confections C on the freezer conveyor 11. As previously described, the transfer conveyor 13 and the freezer conveyor 11 are driven synchronously so that the opened tongs of the carriages are lowered exactly over the confections in the pickup zone in preparation for the closing of the tongs upon the sides of the confections.

The upstream end of the first support rod 310 is supported from the side beam 52 of the conveyor frame 40. The upstream end of the second support rod 312 is supported by posts 320 (FIG. 4) which are secured to the table 308. As shown in FIG. 4, the table 308 is formed by a channel mounted upon plates 322 affixed to the beams 72 and 74 of the transfer conveyor frame. The downstream end of the second support rod 312 is attached to an elongate plate affixed by brackets 323 to the outside face of the table 308 (FIGS. 2 and 4).

The support rod or support track, arrangement for the carriages 34 further includes a vertically adjustable rod 326 which is adapted to support the carriages at the point in the pickup zone PZ where the confections are grasped by the tongs 36a, 36b. The rod 326 is vertically adjustable so that the angle of tilt of the carriages during the critical confection grasping time can be readily changed when a taller or shorter type of confection is to be accommodated. Referring to FIGS. 3 and 15, it will be seen that the support rod 326 is welded to the upper edge of a depending plate 328. The rod 326 is generally straight and is horizontally disposed, except for its upstream end (FIG. 3) which is sloped downwardly to receive the carriages. The upstream end of the support rod 326 is sloped so that when it is raised relative to the adjacent rod 312, the carriages will still be able to ride smoothly upwardly onto the major horizontal portion of the support rod. As seen in FIGS. 3 and 15, the depending plate 328 is mounted to the table 308 by a pair of screws 330 and 332 that are received in slots 334 formed at angles to the horizontal in the plate. A long rod 338 is welded to one end of the plate 328, such rod extending longitudinally to one end of the table 308 (FIG. 3) and through a support bracket 340. Nuts 342 (FIG. 3) are threaded onto the rod 338 on opposite sides of the bracket 340 to enable the position of the rod 338 to be adjusted. By loosening a nut 342 upon the rod and pushing or pulling the rod, the vertical position of the support rod 326 can be adjusted to change the height of the carriage tongs 36a, 36b relative to the confections C on the freezer conveyor.

The support rod, or support track, arrangement for the carriages 34 includes a fourth support rod 346 which is pivotally mounted to the table 308 to slope upwardly in the direction of travel of the carriages (FIGS. 2, 3 and 15). The support rod 346 is pivotable about an axis at its higher downstream end and is mounted on a plate 348, with the plate being secured to a shaft 350 that is pivotally mounted to the table 308. The downstream end of the pivotable rod 346 is curved so that as the plate pivots downwardly, the carriages will smoothly ride onto the upwardly sloped portion 351 of a fifth support rod 352 (FIG. 15). The pivotable rod 346 is positioned laterally adjacent the point in the pickup zone PZ where the confections which have already been grasped are to be elevated from the freezer conveyor. The pivotable support rod 346 therefore upwardly tilts the carriages above the horizontal to lift the confections from the freezer conveyor unless the confection is stuck to the plate, as will be described later.

Assuming that a confection C grasped by carriage 34 is not stuck to the freezer conveyor 11, such carriage will ride upwardly on the pivotable support rod 346 onto the upwardly sloped end 351 of the fifth support rod 352 (FIG. 15). It will be seen in FIG. 3 that the support rod 352 is mounted by posts 354 to the table 308. The support rod 352 has a curvature in top plan (FIG. 2) that is concentric with the sprocket 33a and thereby supports the carriage rollers 170 as the carriages are carried around such sprocket. As shown in FIG. 19, the curved upstream portion of the support rod 352 is horizontal. A sixth support rod 356 is provided downstream of the support rod 352. Such support rod 356 has an upstream end that is also horizontal to mate with support rod 352 and has a curvature concentric with the sprocket 33a, to thereby support the carriages as they are conveyed through the remainder of their travel around the sprocket 33a. The support rod 356 thereafter slopes downwardly and crosses under the path of the endless chain 32 beneath the guide channel 122 to thereby downwardly tilt the carriages into vertically depending orientations (FIG. 19).

Cam Rod For Opening The Tongs

It will be seen from FIGS. 2 and 3 that the cam rod 360 is provided at the upstream end of the pick-up zone PZ for actuating the wedge-operating rollers 268 of the carriages 34 to spread the tongs 36a, 36b. The cam rod 360 generally has an inwardly curved shape top plan (FIG. 2) and has an upstream end which is curved inwardly on a small radius so as to gradually engage the wedge-operating rollers after the carriages have been tilted upwardly above the horizontal by the first support rod 310. The cam rod has an upstream portion 362 (FIG. 3) which is curved along a much larger radius than that of the adjacent sprocket 33i (FIG. 2) so as to extend gradually outwardly of the sprocket 33i to force the wedge-operating rollers outwardly on their respective carriages and thus gradually spread the arms 182a, 182b of the carriages. As best seen in FIG. 3, the cam rod has a downwardly sloped portion 364 which is downstream from the portion 362. Such downwardly sloped portion is straight and extends outwardly away from the endless chain 32 in the direction of travel of the chain. The juncture between the curved portion 362 and the downwardly sloped portion 364 ais located midway between the idler sprocket 33i and the freezer conveyor 11 at a point laterally adjacent the point where the chain 32 departs from the sprocket 33i (that is, at the upstream end of the run of the transfer conveyor chain 32 which is parallel to the delivery run of the freezer conveyor). The cam rod further includes a downstream portion 366 that is straight and extends in a horizontal plane parallel to the path of travel of the endless chain 32. The downstream end 368 (FIG. 2) of the cam rod 360 is inwardly curved to gradually retract the wedge-operating rollers 268 and thus permit the tongs to close upon the confections. Such downstream end of the cam rod is laterally adjacent the verticallay adjustable carriage support rod 326, whereby the tongs of the carriages will close upon the confections at the appropriate height as set by the adjustable mounting of support rod 326.

It will be seen in FIG. 2 that the downwardly sloped section 364 of the cam rod 360 angles slightly outwardly. Such outward slope is provided to compensate for the downward tilting of the carriage about its pivot axis A—A (FIG. 5). As a carriage tilts downwardly during its travel over such sloped section of the cam rod, the outward slope of the rod enables the tongs 36a, 36b to be maintained in their fully open arrangement achieved at the downstream end of the curved portion 352 of the cam rod.

Carriage Bracing Channel

Referring next to FIGS. 2, 3 and 4, the brace rollers 194 at the rear end of the carriages 34 are engaged in bracing channels 370, 372 as they move onto the straight section 318 of the second support rod 312. The guide channels each include a front wall 373 and a rear wall 375 (FIG. 4), the rear wall being relatively higher than the front wall and being adapted to engage the upper surfaces 196 of the brace rollers 194 to permit the carriages to tilt upwardly at such location. The bracing channels serve to stabilize the carriages as they move through the pickup zone PZ. The upstream channel 370 cooperates with the chain guide channel 128 to brace the inner end of the carriage when the deflector 304 (FIG. 23) engages the roller 292 of the friction stop assembly 278. The downstream channel 372 braces the inner end of the carriage when the pneumatic cylinder 242 strikes the rear end of the push rod 232 to release a stuck confection from the tongs.

Stuck Product Release Assembly

The improved transfer conveyor 13 of the present invention further includes a stuck product release assembly which, as shown in FIGS. 14–16, incorporates the pivotal support rod 346. A bracket 349 (FIG. 15) is secured to the lower end of the plate 348 upon which the support rod 346 is mounted. The lower end of the bracket 349 has a leg 349a (FIG. 14) that extends inwardly under the vertically adjustable plate 328. Such leg 349a is biased upwardly by a coil spring 353 connected between a bolt 355 attached to the front wall of the table 308 and a bolt 357 which is connected to the inwardly extending leg 349a. A stop bolt 358 is threaded into the leg 349a adjacent the bolt 357 to which the spring 353 is secured, and the head of the stop bolt is adapted to abut against the lower edge of the front wall of the table 308 to limit the upper position of the support rod 346. The stop bolt is secured by a nut which enables the stop bolt to be reset at different heights to control the slope of the support rod 346. Adjustment of the stop bolt 358 also changes the spring force which urges the support rod 346 upwardly.

When a confection C that has been engaged by the tongs 36a and 36b of a carriage 34 is stuck to a freezer plate 12, the pivotable support rod 346 will be forced downwardly to actuate an actuator arm LV-A of a limit valve LV which, in turn, will actuate the pneumatic cylinder 242 to cause the piston of the cylinder to strike the rear end 233 of the carriage push rod 232, thereby rapidly opening the tongs to thus release the stuck confection (FIG. 16). The valve LV is mounted on a depending bracket 362 so that the actuator arm LV-A thereof is directly below the inner end of the leg 349a of the bracket 349 (FIGS. 14 and 15). A set screw 363 is secured to the leg 349a with the head thereof being aligned with the actuator arm of the valve. The control circuitry which incorporates the valve LV and which operates the cylinder 242 will be described later in connection with FIG. 22. The cylinder 242 is mounted to the angle iron 68 of the conveyor frame section 40. As shown in FIG. 14, a striker plate 365 is attached to the piston of the cylinder and is slidable against an overlying guide plate 367 mounted to a bracket 371.

Deflector Mounting Arrangement

Referring to FIGS. 23 and 24, it will be seen that the deflector 304 is pivotally mounted to the table 308 for rotation about a vertical axis; it is adjustable by a remote mechanism to sequentially reset the positions of the friction stop assemblies 278 of the carriages 34. The deflector, as previously indicated, includes upstanding walls 306a and 306b which converge in the direction of travel of the carriages. The downstream ends of the walls 306a, 306b are sufficiently spaced to let the rollers 292 of the friction stop assemblies pass therethrough. The deflector is mounted on a pin 304a which extends through a collar 374 fixed to the underside of the table (FIG. 4). A short crank arm 376 (FIGS. 4 and 23) is rigidly attached at one end therof to the lower end of the pin 304a and the other end of the crank arm 376 is pivotally attached to the end of a long rod 378 (FIG. 4). The rod 378 extends the length of the support table 308 parallel to the rod 338 and is like the rod 338, secured at its distal end by a pair of nuts 380 to the support bracket 340 (FIG. 23). As shown in FIGS. 23 and 24, by loosening the nuts 380 and pushing (or pulling) the rod 378, the deflector 304 can be pivoted to position either the wall 306a or the wall 306b in the path of the rollers 292 of the carriages. This is done when it is desired to change the closed distances (closed configuration of the arms 182a, 182b) of the carriages to allow for a different width of product to be handled by the transfer conveyor. Then, as the carriages are moved over to the deflector, the wall of the deflector that has been pivoted into the path of travel of the rollers 292 sequentially engages the rollers to thereby reset the friction stop assemblies 278 of the carriages automatically and in sequence without direct manipulation of the carriages. The sequence of movement of a carriage relative to the deflector 304 is shown in FIG. 24 wherein it will be apparent that the rollers 292 are engaging the wall 306b of the deflector to shift the stop assemblies inwardly and thereby move the tongs 36a, 36b closer together in their closed position. As previously noted and as illustrated in FIG. 4, as a deflector engages the roller 292 of the friction stop assembly 278, the brace roller 194 of the carriage is engaged within the guide channel 370. As shown in FIG. 23, when the deflector is shifted outwardly the rollers 292 engage the wall 306a to move the tongs further apart in their closed position.

It is notable that the deflector 304 is positioned upstream from the inwardly curved downstream end 368 of the cam rod 360 (FIG. 2). This positioning enables the deflector to engage the rollers 292 of the friction stop assemblies of the carriages while the wedge assemblies 230 thereof are held away from the stop brackets 280 of the carriages.

Drop Zone

As shown in FIGS. 20 and 21, the pneumatic cylinder 240 at the drop zone DZ is adjustably mounted on a support frame 384 that, in turn, is attached to the main beam 385 of the straight frame section 46 of the transfer conveyor. The piston of the cylinder 240 is adapted to strike the rear end 233 of the push rod 232 of each carriage 34 to thereby rapidly force the push rod forwardly and thus quickly release the confection C from the tongs 36a, 36b of the carriage. It will be seen in FIGS. 1 and 20 that the wrapper conveyor 39, which feeds the confections to a wrapper mechanism 39a (FIG. 1), extends transversely under the transfer conveyor at the drop zone. Advantageously, the confections C are quickly released by both of the tongs 36a, so that they will drop through relatively uniform trajectories onto the wrapper conveyor 39, thereby eliminating the necessity for auxiliary conveyor to properly orient the confections and then feed the oriented confections to a further wrapper conveyor.

Again, referring to FIGS. 20 and 21, it will be seen that the support frame 384 for the pneumatic cylinder 240 includes plate 386, a pair of angle irons 388a, 388b affixed to and extending perpendicularly downwardly from the plate 386, and support legs 390a, 390b extending outwardly at diverging angles from the angle irons 388a and 388b, respectively (FIG. 21). Such support frame is attached to the main beam 385 by bolts extending through a pair of bars 392 which are mounted above the main beam. A pair of support walls 394 (one shown in FIG. 20) extend perpendicularly from the bottom of the support legs 390a and 390b, and support brackets 396 are connected to the ends of such transversely extending support walls 394 to extend parallel to the beam 385. The cylinder 240 is attached to a U-shaped support channel 400 with the piston thereof extending through an aperture formed in the transverse wall of the channel. The side walls of the channel each have an arcuate slot 402 formed therein (FIG. 20). Two bolts 404 are received in such slots for the purpose of adjustably mounting the support channel 400 between the angle irons 388a and 388b. This mounting arrangement enables the cylinder to be held at different angles to the horizontal. A striker plate 406 is attached to the end of the piston of the cylinder 240 and such plate 406 slides over a guide plate mounted on a bracket 410 beneath the piston. The bracket 410 is mounted on a pair of bars 312 that extend outwardly of the support channel 400 to which the cylinder is mounted. An L-shaped roller guide 414 is mounted upon the ends of such bars, such guide 414 including an upstanding wall having tabs 416a and 416b (FIG. 21) formed at the ends thereof. Such tabs 416a and 416b are bent outwardly away from the cylinder 240 to form extended guide surfaces which smoothly engage the brace rollers 194 of the carriages 34 as they are carried therepast. When the cylinder 240 is actuated, the guide 414 thus engages the brace rollers to stabilize the carriage as the tongs thereof are rapidly opened.

The carriages 34 are tilted downwardly at both sides of the straight frame section 46 of the conveyor in the vicinity of the drop zone DZ by curved support rods 418 and 420, the support rod 418 being mounted below the confection release cylinder 240 and the other support rod 420 being mounted at the opposite side of the conveyor section. Such support rods are adjustably secured to the support brackets 396. More particularly, each support rod 418, 420 includes four arcuately curved legs 422 which are secured to the rails 397. The legs 422 have a radius of curvature (FIG. 20) equal to the distance between the axis of rotation A—A of the carriages and the carriage support rollers 170 which ride on the support rods 418, 420. The support rod 418 is shaped and mounted to tilt the carriages outwardly to a desired point where the confections C are to be released. The support rod 420 merely serves to tilt the carriages outwardly enough so that they may be raised over the wrapper conveyor 39.

The pneumatic cylinder 240 is actuated by a limit valve LV2 positioned at the confection drop zone DZ a selected distance upstream from the center of the wrapper conveyor 39 as shown in FIG. 21. The limit valve LV2 is mounted on a bracket 430 which extends outwardly and downwardly of a guide channel 432 for the guide blocks 134 for endless chain 32 such chain moves through the drop zone DZ. The limit valve has an actuator arm LV-A' which is positioned to be engaged by the uppermost roller 174 of each carriage 34. The complete control circuitry, including the limit valve LV2, will be described shortly hereafter in connection with FIG. 22. Generally, when a carriage moves across the support rod 418 to a position where the actuator arm LV-A' is engaged by the upper roller 174 of the carriage, the air flow to the drop cylinder 240 will be reversed to cause the piston thereof to extend rapidly with the striker plate 406 striking the rear end of the push rod 232 of the carriage. This, in turn, forces the carriage wedge assembly 230 forwardly to quickly open the arms 182a, 182b, and thus the tongs 36a and 36b. This action occurs so rapidly that both of the tongs simultaneously disengage from the confection C, rather than one tong at a time which was typical in the operation of the prior art transfer conveyor carriages. Therefore, the confections will drop from tongs without twisting haphazardly and will fall in uniform trajectories onto the wrapper conveyor 39, in a precise, predetermined location.

The wrapper conveyor 39 includes the table 436 having a longitudinally extending slot 438 in center thereof through which a conveyor 440 is adapted to move. Fences 442a and 442b are formed on the sides of the conveyor 440. Such fences are formed by the inner walls of channels and which are equidistantly spaced from the slot 438 (FIG. 21). The conveyor 440 is comprised of a series of uniformly spaced plates 444 mounted on an endless chain 446. The chain 446 slides on a bar 448 disposed centrally below the slot 438. As a confection C is released from the tongs 36a, 36b, of a carriage 34, it will fall through a predetermined trajectory such that it strikes the downstream fence 442a and then is carried forwardly by the conveyor 440.

Pneumatic Control Circuitry

The control circuitry for both the stuck confection release cylinder 242 and the drop cylinder 240 is the same, and thus the schematic diagram of FIG. 22 applies to both. Each control circuit includes the limit valve LV1 (or valve LV2) and a double-acting control valve CV. The limit valve LV1 (LV2) is a single-acting valve which is spring-biased and includes the actuator arm LV-A (LV-A'). Such limit valve has a pressure port LV-P, and exhaust port LV-E and two outlet ports LV-01 and LV-02. The control valve CV includes two opposing actuators CV-A1 and CV-A2 which are connected to the outlet LV-01 and LV-02, respectively, of the limit valve. The control valve CV has an inlet pressure port CV-P, and an exhaust port CV-E and two outlet ports CV-01 and CV-02. The outlet port CV-01 communicates with the rear end of the respective cylinder 240 and 242 to cause the piston thereof to extend when pneumatic pressure is applied thereto, and the other outlet port CV-02 is connected to the forward end of the cylinder to cause the piston to retract when pneumatic pressure is applied thereto. The control circuits for both the cylinders 240 and 242 are arranged such that the air pressure is normally applied from the control valve CV to the front end of the cylinder to retract the piston, as determined by the spring biased setting of the limit valve LV1, LV2. When the actuator arm LV-A, LV-A' of the limit valve is engaged, the circuit will reverse the air flow to the cylinder and cause the cylinder to rapidly extend. As soon as the actuator arm is released, the limit valve rapidly returns to its initial setting before the next carriage is aligned with the piston of the cylinder. The control valve CV is used in addition to the limit valve LV1, LV2 to assure proper sensitivity in quickly opening the arms of the carriages and also to assure that pressure may be rapidly applied to the cylinder.

Operation Of The Transfer Conveyor

The following description of the operation of the transfer conveyor 13 will be presented in connection with the preparation of stickless, rectangular confections C as shown in the drawings, except for FIGS. 13 and 24. The slab confections C are formed in pairs on each of the plates 12 of the freezer conveyor 11 by the extruder and slicer unit 17, as previously described. As stated, the confection slabs are deposited synchronously with the movement of the freezer conveyor so that the slabs are uniformly spaced in series along the freezer conveyor at spacings corresponding to the distances between the carriages 34 of the transfer conveyor 13. The confection slabs C are frozen hard within the freezing vault 10 as the freezer conveyor progresses through the vault. The slabs C then proceed on the outlet reach 14 of the freezer conveyor through the pickup zone PZ of the transfer conveyor.

As previously indicated and shown in FIG. 2 the transfer conveyor 13 and the freezer conveyor 11 are driven by the same motor 24 so that the carriages 34 move synchronously with the freezer conveyor plates 12.

As indicated by FIGS. 17 and 19, the carriages 34 are freely pivotable on the brackets 140 connected to the endless conveyor chain 32. Thus, they hang vertically from the endless conveyor chain, unless and until they are upwardly tilted as the support roller 170 of each carriage is engaged on a support rod. As shown in FIGS. 2 and 18, after the carriages are carried past the idler sprocket 33h at the corner of the coupling section 42 of the modular conveyor frame, they are tilted upwardly by the first support rod 310 to an orientation such that the tongs 36a, 36b extend upwardly above the horizontal (solid lines in FIG. 18). In FIG. 18, the phantom outlining indicates the vertically hanging orientation of a carriage before it has been thus tilted upwardly by the support rod 310.

After having been raised to an angle above the horizontal, the carriages 34 ride on a curved portion of the first support rod 310 and onto a curved horizontal portion 314 of the second support rod 312. At the downstream end of the portion 314 of the second support rod the carriages are still in the orientation shown in the FIG. 18 such that the tongs 36a and 36b are substantially above the freezer conveyor 11. The carriages are then tilted downwardly as they move down the intermediate sloped portion 316 of the second support rod. Thereafter, each carriage moves without changing its orientation horizontally across the downstream portion 318 of the support rod 312. As shown in FIG. 4, during this travel the tongs 36a, 36b of the carriages become generally horizontally registered with the sides of the slab confections C. With further travel, each carriage rides onto the vertically adjustable support rod 326. As shown in FIG. 3, the vertically adjustable support rod is adjusted to the same height as the horizontal downstream portion 318 of the second support rod. Such position of the vertically adjustable support rod is the lowest position thereof which position is applicable for the handling of slab type frozen confections.

It will be appreciated from the foregoing description that the tongs 36a, 36b of the carriages 34 are normally closed under the force of the coil spring 250 and also the leaf springs 216a and 216b; thus, the tongs are closed when the carriages hang vertically from the endless conveyor chain 32 as shown in FIG. 17 (in phantom lines). The tong-receiving arms 182a, 182b, and thus the tongs, are opened by the cam rod 360 positioned at the upstream end of the pickup zone. Such cam rod bears against the wedge operating roller 268 of the wedge assembly 230 of each carriage to gradually force the tongs into an open position, as shown in FIG. 11. The cam rod fully opens the tongs of the carriage by the time the carriage reaches the junction 362a at the upstream end of the downwardly sloped section 364 (FIG. 3) of such cam rod. The tongs are maintained in such fully opened position as the carriage rides upon the downwardly sloped section 364 of the cam rod to thereby position the tongs 36a and 36b in general registry with the sides of the slab confection to be grasped.

It will be seen that the deflector 304 (FIGS. 2 and 23), which sets the position of the stop roller 292 of each carriage, is laterally aligned with the upstream end of the horizontal secton 366 of the cam rod 360. The friction stop assembly 278 of each carriage may thus be repositioned by the deflector without the wedge assembly 230 bearing against the friction stop assembly 278 during such process.

With continued travel of the carriage 34 from the position shown in FIG. 11, the inwardly curved downstream end portion 368 of the cam rod 360 will guide the wedge operating roller 268 rearwardly as the associated push rod 232 retracts to thereby close the tongs 36a, 36b upon a confection C. This retraction of the push rod 232 continues until the locknut 284 abuts against the stop bracket 280 of the friction stop assembly of such carriage. As shown in FIG. 12, this causes the tongs to close upon the confection slab, with the tips of the tongs piercing the slab to a selected depth, such final spacing of the tongs corresponding to the closed distance selected by the adjustment of the friction stop assembly 278. It will be seen in FIG. 2 that the downstream portion 368 of the cam rod 360 is aligned with the vertically adjustable support rod 326, thus assuring that the tongs will engage the side of the slab confection at the appropriate height above the freezer plate 12 (FIG. 4).

Referring to FIG. 14, if the slab is not frozen hard to the associated freezer plate 12, it will be picked up from such plate as the carriage 34 rides up the pivotally mounted support rod 346. Further travel of the carriage will cause the carriage to be tilted farther above the horizontal by the sloped upstream end of the fifth support rod 352. FIG. 19 illustrates with respect to a carriage 34a the upward inclination of the carriage which is riding upon the horizontal portion of the fifth support rod 352. The FIGS. 17 and 19 illustrate the subsequent downward tilting of the cariages as they move down the sixth support rod 356 (which is shown in FIG. 19 and also in phantom outline FIG. 17).

In the event a confection C is frozen firmly to a freezer plate 12, the stuck confection release assembly, including the cylinder 242, operates to quickly open the tongs 36a and 36b to release the stuck confection and permit it to remain on the plate to which it has adhered before the carriage can be bent or otherwise damaged. Referring to FIG. 16, when the confection is stuck to a freezer plate, the carriage depresses the pivotable support rod 346 so as to trip the limit valve LV1. Referring to FIG. 22, the limit valve will actuate the control valve CV to reverse the air flow to the pneumatic cylinder 242 and thereby extend the piston thereof to strike the rear end of the push rod 232 of the carriage forcing the wedge assembly 230 against the arms 182a and 182b to open the tongs and release the stuck confection. In order to resist the force imposed upon the carriage, the lower end of the brace roller 194 abuts against the front wall 374 of the channel 372 (FIG. 16), thereby bracing the rear end of the carriage. The stuck confection may thereafter be scraped from the plate by a scraper bar (not illustrated) that is positioned over the freezer conveyor 11 at a location upstream from the extruder and slicer unit 17.

As previously described, once the confection C is picked up it may be carried through the enrober 37 and dry coater 38 to, for example, apply a coating of chocolate and nuts to the surface of the confection. After a selected length of travel to permit the coated product to dry, the completed confection is brought into the drop zone DZ. At the drop zone, the carriage is tilted upwardly from its hanging position by the support rod 418 to a selected angle (FIG. 20). The carriage then actuates the limit valve LV2 a short distance upstream from the downstream fence 442a of the wrapper conveyor 39 where the uppermost roller 174 at the top front of the carriage strikes the actuator arm LV-A' of the limit valve LV2. Upon the actuation of the valve, the control circuit (FIG. 22) operates as previously described to reverse the air flow to the cylinder 240 and rapidly extend the piston thereof so as to strike the rear end of the push rod 232 and thus quickly open the tongs 36a, 36b. The tongs will thus rapidly open to simultaneously disengage from the confection permitting the confection to fall without twisting through a predicted trajectory to land on the wrapper conveyor in a predictable spot and in a controlled orientation. The confection will fall from the carriage such that it strikes the downstream fence 442a of the wrapper conveyor.

After such release of the confections, the carriages 34 will be tilted back to their hanging positions by the support rod 418 and will then move to the rinsing apparatus 41 (FIG. 1) where they are cleaned in preparation for returning to the pickup zone PZ.

Switch-Over To A Different Confection

As shown in FIG. 13, the carriages 34 may be provided with a different set of tongs 500a and 500b which are adapted to handle a stick-type of confection C'. As previously indicated, the copending United States patent application of S. D. Cross, filed on even date herewith and identified by Ser. No. 045,041, describes the spring clip arrangement which enables the tongs 36a and 36b to be quickly removed by simply upwardly pivoting the tongs relative to the arms 182a and 182b, respectively, to which they are connected. Then, the new set of tongs 500a, 500b may be attached to the arms.

The next step in the changeover operation is to adjust the vertically adjustable support rod 326 which controls the height at which the tongs 500a and 500b engage the new type of confection C' on the freezer conveyor. To do this, the nuts 342 and 344 (FIG. 3) are adjusted on the rod 338 to adjust the height of the support rod 326 to the appropriate level so that the stick receiving notches of the tongs 500a, 500b will be aligned with the stick of the confecton C' supported on the freezer conveyor.

The support rod 418 at the drop zone DZ may then be adjusted to change the angle at which the carriages are supported in the drop zone. Also, the position of the limit valve LV2 may be changed to cause the stick-type confection C' to be released at the appropriate time. If the support rod 418 is adjusted, the angle of tilt of the cylinder 240 is also changed to realign it with the carriage.

Finally, the deflector 304 at the upstream end of the pickup zone PZ is rotated to change the closed distances of the carriages and adapt them to the new type of confections. Referring to FIG. 13, it will be noticed that the closed distance between the outer ends of the tong-receiving arms 182a and 182b is much smaller than that for the stickless confection as shown in FIG. 12. This requires that the stop bracket 280 of the friction stop assembly 278 be moved rearwardly in the carriage, i.e. closer to the pivot axis through the pins 186a and 186b of the arms 182a and 182b. Referring to FIG. 23, it will be seen that this adjustment is made by loosening the nuts 380 and 382 at the end of the rod 278 and extending the rod 378 in the direction of the deflector to thereby pivot the deflector in a counterclockwise direction and thus bring the front wall 306b of the deflector into the path of travel of the stop rollers 292 of the carriages as such stop rollers were positioned for handling the stickless slab-type of confection. Thus, as illustrated in FIG. 24, such wall 306b of the deflector cams the stop rollers inwardly from the old position shown with respect to the carriage 34c (phantom outline) to the new position shown with respect to the carriage 34d (also shown in phantom outline). This camming is accomplished automatically for all of the carriages as the carriages are sequentially carried by the deflector. Thus, the carriages may be reset for the new type of confection in a fraction of the time that was required for the prior art transfer conveyors for confection products.

Although the best mode contemplated for carrying out the present invention has been herein shown and described, it will be apparent that modification and variation may be made without departing from what is regarded to be the subject matter of the invention.

What is claimed is:

1. A conveyor adapted to remove products such as frozen confections from a pickup area and to deliver the products to a receiving area comprising main frame means, endless conveyor means supported on said main frame means, a plurality of carriages mounted in series upon said conveyor means, each carriage comprising a carriage frame, a pair of arms pivotally mounted for scissoring movement to said carriage frame at their inner ends, spring means normally urging said arms toward each other into a closed position, tongs fastened to the outer ends of said arms, said tongs having means for engaging the product to be transferred when said arms are scissored together, a rod, a wedge mounted to said rod and engageable with the inner opposed sides of said arms, means for slidably mounting said rod with said wedge attached thereto for axial reciprocation along an axis intermediate said arms, a stop adjustably mounted upon the carriage frame for stopping the movement of said wedge under the pressure of said spring means so that said wedge holds the arms at an initial spacing selected according to the size of the products to be engaged by the tongs, means mounted to said main frame means at the pickup area for engaging said rod to move it axially in a direction opposed to the force of said spring means to open said arms and permit a product to be positioned between said tongs, striker means at said receiving area for engaging said rod, means for mounting said striker means for linear travel in a direction in alignment with said rod, and means for rapidly moving said striker means when the carriage is in a position where the product is to be released to thereby move said rod axially in said direction to rapidly open said arms and thus quickly release the product from the tongs.

2. The conveyor according to claim 1, wherein said conveyor means comprises an endless chain, each carriage being pivotally mounted in uniformly spaced relationship to said endless chain, each carriage including roller means, and track means mounted to said main frame means upon which said roller means is adapted to ride, said track means being configured to consecutively first lower and thereafter raise the carriages in the vicinity of the pickup area.

3. The conveyor according to claim 2 wherein said track means includes a first portion generally laterally aligned with the pickup area to support the carriage when a product is first engaged thereby and a second portion downstream of said first portion which is upwardly inclined in the direction of travel of the carriage so as to raise the outer end of the carriage and thereby lift the product engaged in the tongs from the pickup area, the second portion being pivotally mounted adjacent one end thereof to said main frame means, means for normally urging said second track portion upwardly against the associated roller of a carriage as such carriage passes thereover, means positioned laterally of said second track portion for selectively striking the inner end of a rod of a carriage to rapidly open the arms thereof, and means for controlling said last named means including switch means which is positioned relative to said second track portion so as to be engaged by said second portion when such second portion is pivoted by a product being stuck at said pickup area, thereby actuating said means for selectively striking to rapidly open the arms of the associated carriage to disengage the tongs from the stuck product.

4. A conveyor apparatus for sequentially picking up products such as frozen confections from a pickup area and transferring the products to a receiving area, said apparatus being of the type including a main frame positioned adjacent the pickup area, an endless conveyor mounted to said frame, a plurality of carriages mounted to said conveyor to move between the pickup area and said receiving area, each carriage including a pair of arms which are scissorable between open and closed positions, tongs mounted to said arms for engaging a product when said arms are in said closed position, means for opening said arms prior to arriving at said pickup area to enable the tongs to be lowered to an elevation aligned with a product to be picked up, means for lowering the carriages to position the tongs thereof at a location where they may be closed to grasp a product, means for thereafter closing the arms to thereby cause the tongs to grasp a product, means for opening said arms at said receiving area to thereby release a product grasped by said tongs, each of said carriages including a carriage frame, means for pivotally mounting said arms to said frame for pivoting about parallel axes, rod means slidably mounted to said carriage frame for reciprocation along a longitudinal axis, the rear end of said rod means projecting outwardly of said carriage frame when said arms are in said closed position, wedge means attached to said rod means which is bearable against said arms for outwardly scissoring said arms as said rod is pushed forwardly relative to the said arms, first spring means for normally urging said arms against said wedge means, second spring means for normally urging the rod means in a rearward direction on said carriage frame, and adjustable stop means mounted to said carriage frame for engagement with said rod means for stopping said rearward movement of said rod means under the urging of said second spring means at a position selected according to the size of the products to be conveyed, said means for opening said arms at said pickup area comprising a camming member stationarily mounted to said main frame for engaging said rod means to enable said first and second spring means to close the tongs on a product, said means for opening said arms at said receiving area comprising means for striking the rear end of said rod means to push the rod means forwardly of said carriage frame.

5. The conveyor apparatus according to claim 4 wherein said adjustable stop means includes a stop member, and means for slidably mounted said stop member to said carriage frame for movement along a path parallel to said rod means, said slidable mounting means engaging said carriage frame with enough friction to remain in place against the forces exerted on said rod means by said first and second spring means, and said stop means further including abutment means projecting outwardly of said carriage, and deflector means adjustably mounted to said main frame for engaging said abutment means with sufficient force to overcome said friction and shift said stop member to a new position on said carriage frame as said carriage is moved against said deflector means by said conveyor, whereby the stop members of the plurality of carriages may be sequentially reset as the carriages are carried past said deflector means.

6. The conveyor apparatus according to claim 5 wherein said deflector means includes a deflector member defining an elongate wall, means for pivotally mounting said deflector member for rotation about an axis that is parallel to said wall, and means for securing said deflector member to said main frame such that said wall forms a selected angle with the path of travel of the carriages, whereby when said wall is pivoted to a new orientation, said abutment means of said carriages are sequentially deflected by said wall to a desired new position on their respective carriage frames.

7. The apparatus according to claim 6 wherein said abutment means of each carriage comprises a roller which is rotatable about an axis that depends perpendicularly from said carriage, said deflector member being mounted to said main frame below said carriages.

8. The apparatus according to claim 5 wherein each carriage further comprises second abutment means rigidly mounted to said carriage frame and extending outwardly thereof, and channel means mounted to said carriage frame for bracing said second abutment means when said deflector means is operative to engage said first abutment means.

9. The apparatus according to claim 8 wherein said arms of each carriage are pivotally engaged on at lease one pin, and said second abutment means comprises a roller that is rotatably mounted on the bottom end of said pin below said carriage frame to extend downwardly thereof, said channel means comprising a channel extending parallel to said conveyor means for receiving said pin.

10. The apparatus according to claim 4 wherein said carriage frame includes a plate underlying said rod means and extending parallel thereto, said plate having a slot formed therein, said stop means including bolt means which extends through said slot, said bolt means including low friction surfaces for bearing against said plate, said bolt means being tightened to apply a selected amount of friction against said plate to enable said bolt means to slide relative to said plate but resist the rearward forces against said rod means induced by said first and second spring means associated with said arms.

11. A conveyor apparatus adapted to pick up products such as frozen confections from a first area and drop said products at a second area comprising: a main frame, endless conveyor means mounted to said main frame to move between said first and second areas, a plurality of carriages mounted to said conveyor, each carriage including a carriage frame, a pair of arms pivotally mounted to said carriage frame to scissor between an open configuration and a closed configuration, tongs mounted to the outer ends of each of said arms, said tongs being adapted to engage the product to be conveyed, wedge means reciprocatably mounted to said carriage frame equidistantly between said arms for opening said arms, said wedge means being reciprocatable between an extended position which causes the arms to be opened and a retracted position which enables the arms to close, spring means for normally urging said arms into a closed configuration, stop means adjustably mounted to said carriage frame for stopping the retracting movement of said wedge means at a selected retracted position thereby controlling the closed configuration of said arms, said stop means being slidable on said carriage frame and bearing against said carriage frame with sufficient friction to overcome the spring means when said arms are in their closed configuration, abutment means attached to said stop means and extending outwardly of said carriage, means mounted to said main frame for selectively deflecting said abutment means to sequentially adjust the position of the associated stop means, means mounted to said main frame in the vicinity of said first area for bearing against said wedge means to extend and retract said wedge means to thereby open and close said arms to engage a product between said tongs, and means in the vicinity of said second area for engaging said wedge means to extend said wedge means to thereby release the product at said second area.

12. The apparatus according to claim 11 wherein said abutment means comprises a roller extending outwardly of said carriage frame, and said means for selectively deflecting includes an elongate wall and means for pivotally mounting said wall to secure said wall at various rotative positions relative to the path of travel of the carriages, said deflector wall being rotatable to move said deflector wall into the path of travel of the rollers of the carriages.

13. The apparatus according to claim 11 wherein said wedge means comprises a push rod reciprocatably mounted to said carriage frame to move along a path which is located equidistant between said arms, a wedge member connected to said rod adapted to bear against opposing portions of said arms to scissor the arms outwardly as the push rod is extended relative to the carriage, said spring means comprising a coil spring associated with said push rod for normally urging the rod into a retracted position and further spring means for urging said arms inwardly against said wedge member.

14. The apparatus according to claim 13 wherein said adjustable stop means comprises a stop member which is reciprocatable in a slot formed in said carriage frame below said push rod for engagement with said push rod, roller means mounted to said stop member and extending outwardly of said carriage frame, said means for selectively deflecting including a deflector wall adjustably mounted to said main frame at a selected angle with an intersecting path of travel of said roller means of the the carriages as said carriages are moved relative to said deflector wall.

15. The apparatus according to claim 11 wherein each of said carriages is pivotally mounted to said endless conveyor means to freely pivot about an axis parallel to said endless conveyor means, each carriage including roller means extending from near the outer end thereof, contoured track means positioned in the vicinity of the first area for engaging said roller means of said carriages to support the outer ends of the carriages at selected angles with the horizontal, said carriages each including at least one brace roller rotatably mounted to the rear end of the carriage frame to extend outwardly thereof, and a channel mounted to said main frame in the vicinity of said receiving area for engaging said brace rollers as said carriages are moved relative to said channel, said means for selectively deflecting being mounted to said main frame at a postion which is laterally adjacent said channel, whereby when said means for deflecting engages the abutment means of a carriage, said channel engages said brace roller to buttress the rear end of the carriage.

16. The apparatus according to claim 15 wherein said means for opening and closing the arms includes a cam having a contour to first open the arms of a carriage at a postion upstream from said means for deflecting and to thereafter continue to maintain the arms in their open configuration as said means for deflecting engages the abutment means of said carriage to reposition the stop means of the carriage.

17. An improved transfer conveyor for products such as frozen confections which is adapted to pick up the products at a first area and deliver them to a second area, a conveyor assembly including a main frame, an endless conveyor mounted to said main frame to move from said first area to said second area, a plurality of carriages mounted in series to said conveyor, each carriage including a carriage frame, means for pivotally mounting each carriage frame to said endless conveyor for rotation about an axis parallel to said endless conveyor, a pair of arms, means pivotally mounting the rear ends of the arms to said carriage frame to enable the arms to be scissored between opened and closed positions, a pair of tongs mounted to said arms, said tongs being adapted to engage a product when said arms are closed, each carriage including roller means extending outwardly thereof, first track means rigidly mounted to said main frame in fixed horizontal relation for engaging said roller means to tilt each of the carriages to an orientation such that the tongs thereof are generally aligned with the product to be picked up, means for opening the arms of the carriages as the carriages ride on said first track means and for maintaining said arms in an open position so that the tongs may be pivoted downwardly and over the products to be picked up, a second track means downstream of said first track means for supporting the carriages at said first area where the products are to be picked up, means for permitting said arms to close upon the products at said first area while said carriages are supported onto the second track means, said second track means being separate from said first track means and including a rod and means for adjustably mounting said rod to said main frame so that said rod may be raised and lowered to thereby adjust the height of the tongs relative to the products to be picked up at said first area.

18. An improved conveyor for frozen confections and the like adapted to remove the confections at a first area and deliver them to a second area, said conveyor comprising: a main frame, an endless conveyor mounted to said frame to move from said first area to said second area, a plurality of carriages pivotally mounted to said endless conveyor; each carriage including a carriage frame, means for pivotally mounting said carriage frame to said conveyor for rotation about an axis parallel to said conveyor, each carriage including a pair of arms and a tong connected to each arm, means pivotally mounting the rear ends of said arms to said carriage frame, means in the vicinity of said first area for opening said arms, first track means for supporting the outer ends of the carriages at a selected angle with the horizontal as said arms are opened and for downwardly tilting the carriages after the arms have been opened to thereby position the tongs on either side of a product to be grasped by said tongs at said first area, means for closing said arms at said first area to enable the tongs to grasp the product, and second track means for upwardly tilting the outer ends of the carriages to raise the product from said first area; means at said first area for quickly opening said arms in the event the product is stuck at said first area, said second track means including a pivotable member for supporting the outer end of each carriage, means for biasing said pivotable member upwardly against the carriages as each carriage is conveyed thereon, switch means having an actuator positioned relative to said pivotable member to be engaged thereby when said member is pivoted counter to said biasing means, and control means actuated by said switch means for energizing said means for opening said arms when said pivotable member is pivoted counter to said biasing means, whereby when a product is stuck at said first area, the pivotable member will actuate said switch means to thereby energize said means for opening said arms thus cause the stuck product to be released.

* * * * *